United States Patent [19]

Lynch

[11] Patent Number: 5,859,998
[45] Date of Patent: Jan. 12, 1999

[54] HIERARCHICAL MICROCODE IMPLEMENTATION OF FLOATING POINT INSTRUCTIONS FOR A MICROPROCESSOR

[75] Inventor: Thomas W. Lynch, Austin, Tex.

[73] Assignee: Advanced Micro Devices, Inc., Sunnyvale, Calif.

[21] Appl. No.: 820,961

[22] Filed: Mar. 19, 1997

[51] Int. Cl.[6] ........................................ G06F 9/302
[52] U.S. Cl. .................... 395/563; 395/384; 395/566; 395/800.23
[58] Field of Search ................... 395/384, 563, 395/566, 800.23

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,125,092 | 6/1992 | Prener ..................................... 395/706 |
| 5,129,067 | 7/1992 | Johnson . |
| 5,136,697 | 8/1992 | Johnson . |
| 5,155,816 | 10/1992 | Kohn ....................................... 395/381 |
| 5,226,126 | 7/1993 | McFarland et al. . |
| 5,226,130 | 7/1993 | Favor et al. . |
| 5,574,928 | 11/1996 | White et al. ........................ 395/800.23 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—William M. Treat
*Attorney, Agent, or Firm*—Conley, Rose & Tayon, PC; B. Noel Kivlin

[57] ABSTRACT

A microprocessor implements a hierarchical microcode implementation for floating point instructions. Floating point instructions are classified as microcode instructions. The microcode unit parses the floating point instructions into one or more floating point operations and one or more integer operations such as memory load operations. The floating point operations are conveyed to the floating point unit. The memory load operations load the floating point operands of the floating point operations. Floating point operands that are wider than integer operands are handled by multiple memory load operations. Each memory load operation loads a portion of the floating point operand. The portions of the floating point operand are combined is a queue in the floating point unit. When the floating point unit has received the floating point operation and the memory operands that comprise with the floating point operand, the floating point unit dispatches the floating point instruction for execution. Floating point instructions that are too complex to be completed in one pass through the floating point execution pipeline are further parsed into a plurality of floating point operations by the floating point unit.

21 Claims, 15 Drawing Sheets

130 ⟵

Result[31:0]
Result Valid
Flag[6:0]
Branch
LS_Sync
SBZ
Exception[1:0]
Breakpoint[1:0]
LIB[3:0]
FLIB[3:0]
LIL[2:0]
FLIL[3:0]
Cancel
Destination[5:0]
Destination Valid
WRFL[3:0]
Size[2:0]
End_Byte[3:0]
CRET
PC_SEL
Sel_eflg
INT_ENB
Store
WSR
Null
Exit
Entry Valid

Branch Misprediction
CSSEL[15:0]
Floating Point
FPOPC[10:0]
FSYNC
Last1
Last2
Linetag1[4:0]
Linetag2[4:0]
LineOffset1[3:0]
LineOffset2[3:0]
MROM
NoMisp
PC1[31:0]
PC2[31:0]
PCSHFT
VLTAG[3:0]
VLTAGP1[3:0]

FIG. 9

HIERARCHICAL MICROCODE IMPLEMENTATION OF FLOATING POINT INSTRUCTIONS FOR A MICROPROCESSOR

BACKGROUND OF THE INVENTION

1. Field of the Invention

This invention relates to the field of microprocessors and, more particularly, to the handling of floating point instructions within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the number. The binary point is assumed to be to the right of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the binary, and the remaining bits to the right of the binary. The bit to the left of the binary is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) standard 754.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Floating point data types and floating point instructions produce challenges for the microprocessor designer. For example, operands of floating point instructions may be larger than operands of integer instructions. As noted above, floating point numbers may be 32, 64, or 80 bits in width. In contrast, integer instructions typically have operands that are 32 bits or less. Because the microprocessor must accommodate 80 bit floating bit operands, data paths and other circuitry of the microprocessor must be designed to handle 80 bit operands. When the microprocessor is executing integer operations, which typically comprise the majority of instructions, the additional data paths and circuitry for handling 80 bit operands are not utilized. This additional and largely nonutilized circuitry increases the size of the microprocessor. Increasing the size of the microprocessor, disadvantageously reduces the maximum clock rate at which the microprocessor can operate, increases the power dissipation of the microprocessor, and reduces the yield in manufacturing the microprocessor.

SUMMARY OF THE INVENTION

The problems outlined above are in large part solved by a hierarchical microcode implementation of floating point instructions. Floating point instructions are classified as microcode instructions. The microprocessor routes all microcode instructions to a microcode unit that parses microcode instructions into a plurality of simpler instructions. The microcode unit parses floating point instructions into one or more floating point operations and one or more integer operations. For example, a floating point instruction with an 80-bit floating point operand may be parsed into a floating point operation and three integer memory load operations. The floating point operations are conveyed to the floating point unit. Each integer memory load operation loads a memory operand of the same width as an integer operand. Each memory operand is a portion of the floating point operand. In the above example, two memory load operations would load 32-bit memory operands and one memory load operation would load a 16-bit memory operand. The three memory operands comprise the 80-bit floating point operand. In this manner, the floating point instruction is handled like a plurality of integer instructions, and the integer portion of the microprocessor does not have to be designed to handle floating point operands. The microprocessor can be optimized for integer operations.

The memory load operations are dispatched by the microcode unit to a load/store unit. The load/store unit loads the memory operands and conveys them to the floating point unit. The floating point unit has an assembly queue which receives the floating point operation from the microcode unit and the memory operands from the load/store unit. The assembly queue stores the floating point operation and the memory operands until all of the memory operands have been loaded.

As noted above, microcode instructions are parsed into a plurality of simpler instructions. The group of simpler instructions are referred to as a microcode sequence. To reduce the number of microcode sequences required to implement the floating point instructions, groups of floating point instructions use the same microcode sequence. A floating point opcode is substituted for the floating point opcode within the microcode sequence. For example, a floating point add instruction with a 64-bit memory operand uses the same microcode sequence as a floating point multiply instruction with a 64-bit operand. The integer operations dispatched from the microcode unit are the same. The opcode portion of the floating point operation is patched from an opcode register. The opcode register stores a partially decoded opcode of the floating point instruction. In this manner, one microcode sequence can be utilized for multiple floating point instructions, which thereby reduces the number of microcode sequences that are stored in the microcode unit. The floating point unit includes a nanocode unit to parse complex floating point operations into a plurality of simpler floating point operations. When the floating point unit receives a floating point operation, it decodes the floating point operation to determine whether the floating point operation can be executed with one pass through the floating point execution pipeline. Instructions that are too complex to be completed in one pass through the floating point execution pipeline are conveyed to a nanocode unit. The nanocode unit issues a plurality of floating point operations to perform the function of the original floating point operation. By breaking down the floating point operation into a plurality of simpler floating point operations within the floating point unit, the microcode unit only issues one floating point operation. If the integer portion of the microprocessor is superscalar, it is advantageous to limit the number of floating point operations issued from the microcode unit. Because only one floating point operation is issued each clock cycle from the superscalar integer side, issuing multiple floating point instructions from the microcode unit may not efficiently use the available dispatch positions with the microprocessor.

Broadly speaking, the present invention contemplates a circuit for executing floating point instructions including a microcode unit and a floating point unit. The microcode unit stores a plurality of microcode sequences to effectuate the function of the floating point instructions. One of the microcode sequences includes a floating point operation and one or more integer operations. The integer operations load a floating point operand for the floating point operations. The floating point unit is coupled to the microcode unit. The floating point operation is conveyed to the floating point unit. The floating point unit executes the floating point operation when the integer operations have loaded the floating point operand.

The present invention further contemplates a method for executing floating point instructions including: receiving a floating point instruction; generating a microcode entry point for the floating point instruction, wherein the microcode entry point identifies a microcode sequence that includes a floating point operation and one or more integer operations; conveying the floating point operation to a floating point instruction unit; dispatching the one or more integer operations into an instruction processing pipeline; executing the floating point operation; and storing a result of the floating point operation.

BRIEF DESCRIPTION OF THE DRAWINGS

Other objects and advantages of the invention will become apparent upon reading the following detailed description and upon reference to the accompanying drawings in which:

FIG. 8 is a table of information stored for each instruction within a line of storage according to one embodiment of the reorder buffer shown in FIG. 4.

FIG. 9 is a table of information shared by the instructions within a line of storage according to one embodiment of the reorder buffer shown in FIG. 4.

Figure 1:
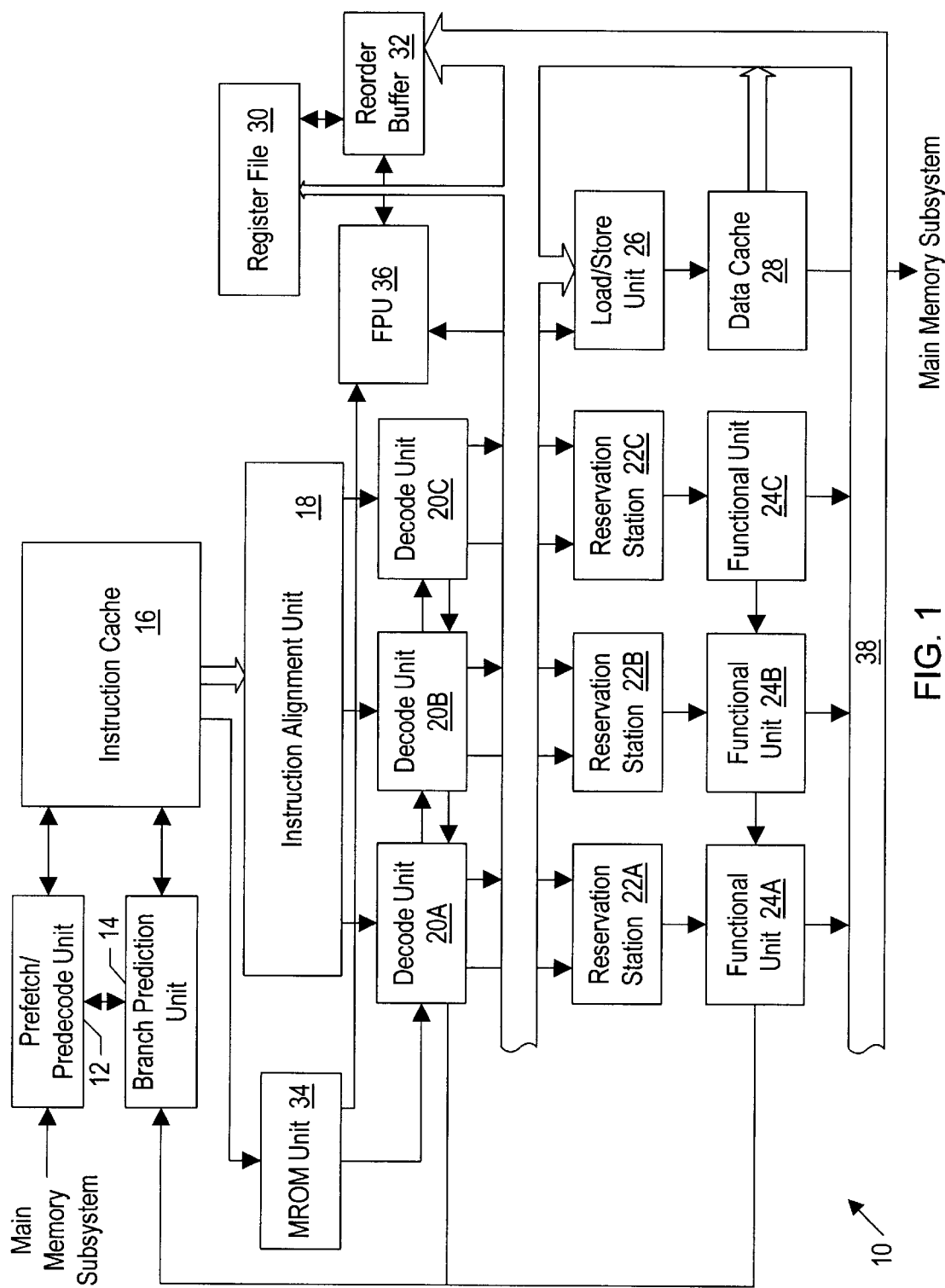
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 is an example of a microcode unit. MROM unit 34 parses the floating point instruction into one or more floating point operations which are transmitted to floating point unit 36 and one or more integer operations, or memory operations, for memory unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

In one embodiment, microprocessor 10 is optimized for 32 bit operands. Therefore, the data paths and other circuitry of load/store unit 26 are designed to load 32 bits of data from memory. As noted above, floating point operands may be as large as 80 bits. When a floating point instruction involving an operand larger than 32 bits is encountered, MROM unit 34 parses the floating point instruction into a plurality of memory operations that each load a portion of the floating point operand. For example, if a floating point instruction involves an 80 bit operand to be loaded from memory, MROM unit 34 issues three memory load operations to load/store unit 26. The first two memory operations each load a 32 bit memory operand. The third memory operation loads a 16 bit memory operand. An assembly queue in the floating point unit stores the floating point operation transmitted from MROM unit 34 and the memory operands conveyed from load/store unit 26 until all of the memory operands have been received. The three memory operands comprise three portions of the floating point operand required for the floating point instruction. By loading the floating point operand in three portions, the integer portion of the microprocessor can be optimized for 32 bit operands.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
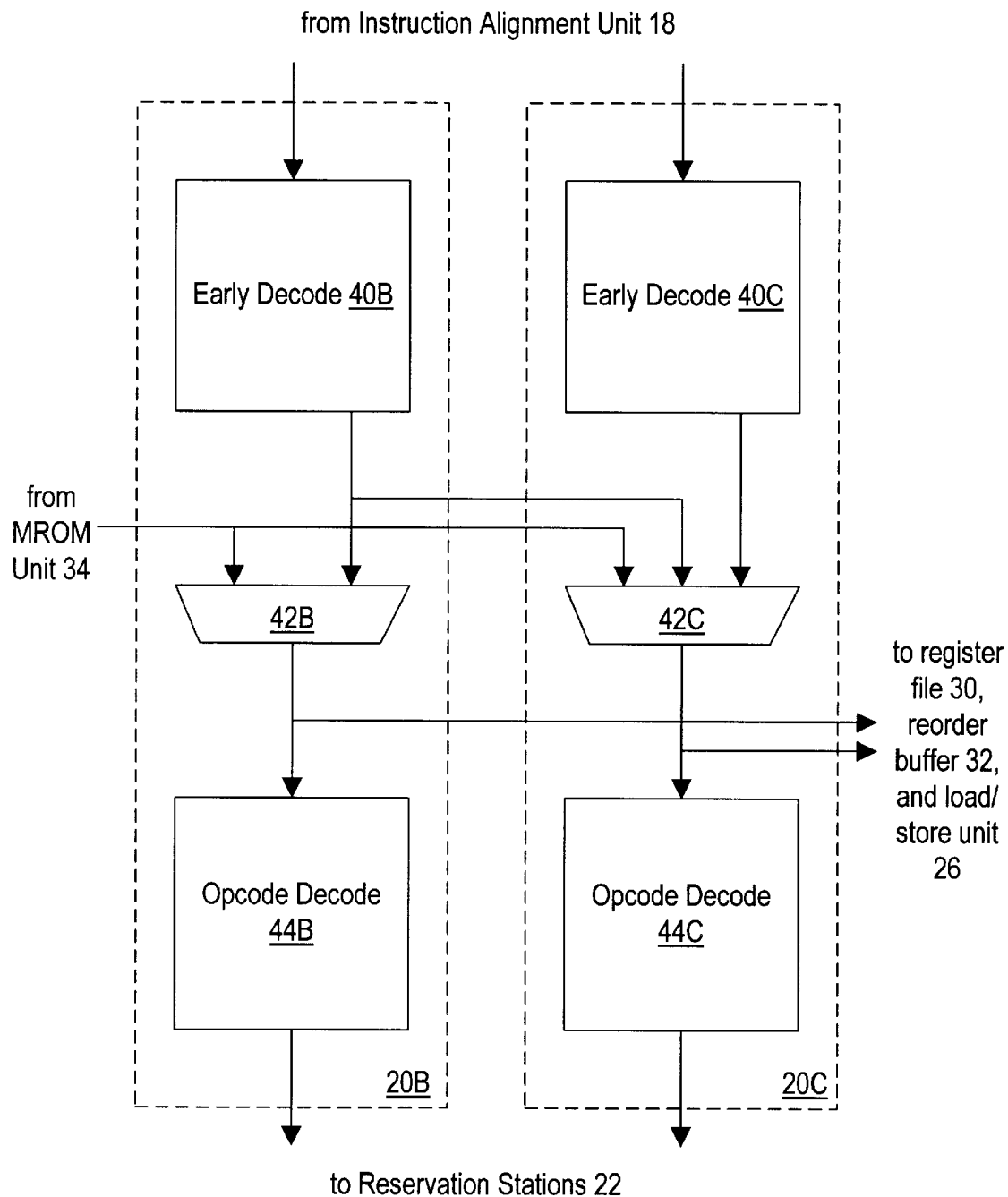
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
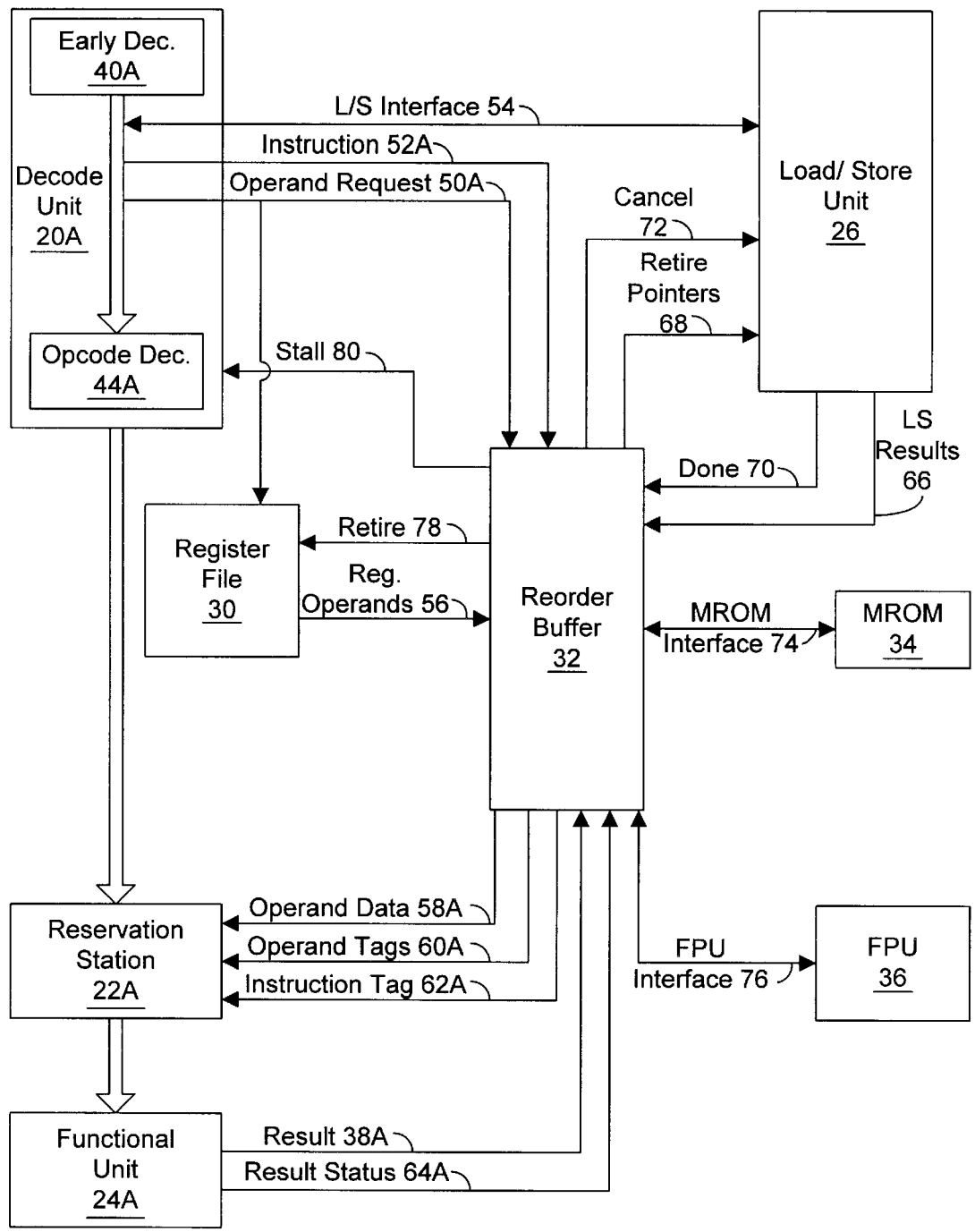
FIG. 3 is a diagram highlighting interconnection between a decode unit, a load/store unit, an MROM unit, a floating point unit, a functional unit, a reservation station, and a register file shown in FIG. 1, according to one embodiment of the microprocessor.

Turning next to FIG. 3, a block diagram of decode unit 20A, reservation station 22A, functional unit 24A, register file 30, reorder buffer 32, FPU 36, MROM 34, and load/store unit 26 is shown. Interconnection between the units is shown according to one embodiment of microprocessor 10. Other embodiments may employ other interconnection, and additional interconnection may be employed for other purposes. Interconnection between decode units 20B–20C, reservation stations 22B–22C, functional units 24B–24C and the remaining elements of FIG. 3 may be similar.

Decode unit 20A receives an instruction from instruction alignment unit 18. Early decode unit 40A detects the operands used by the instruction and conveys indications of the register operands to reorder buffer 32 and register file 30 upon an operands request bus 50A. Register pointers are conveyed, and the source and/or destination nature of the operand is identified. For the fast path instructions described above, up to two source operands may be identified, one of which is the destination operand as well. Still further, flag operands are identified upon operand request bus 50A. In one embodiment, the flag operands are divided into three groups: the carry flag, the status and direction flags, and the remaining flags. For embodiments employing the x86 microprocessor architecture, the status and direction flags are the D, 0, S, Z, P, and A flags. Immediate data is conveyed to reorder buffer 32 upon immediate bus 51A. Reorder buffer 32 relays the immediate data upon operand data bus 58A. Most x86 instructions specify either a second register operand or immediate data, but not both. Therefore, the portion of operand data bus 58A used to convey the second register operand value may be used to convey the immediate data. For branch instructions, the program counter address, an offset, and the predicted target address may be conveyed upon operand data bus 58A.

Decode unit 20A additionally conveys certain information regarding the instruction to reorder buffer 32 upon an instruction bus 52A. Exemplary instruction information employed in one embodiment of microprocessor 10 is described in more detail further below. Additionally, early decode unit 40A detects load/store memory operations specified by the instruction. An indication of the memory operations is conveyed to load/store unit 26 via load/store interface 54.

In response to the operands conveyed upon operands request bus 50A, register file 30 conveys register operand values upon register operands bus 56 to reorder buffer 32. The register values conveyed comprise the values stored in register file 30 (i.e. the values generated according to the instructions previously retired by reorder buffer 32). If reorder buffer 32 is not storing information regarding an instruction which uses the register as a destination operand, the value provided by register file 30 is conveyed to the reservation station 22A–22C which receives the instruction. For example, a register value corresponding to the instruction conveyed to reservation station 22A may be conveyed upon operand data bus 58A.

Alternatively, reorder buffer 32 may be storing information regarding an instruction which updates the requested register. If the instruction has executed and has provided an instruction result, that result is conveyed in lieu of the register value provided by register file 30 upon operand data bus 58A. If the instruction has not yet executed, the reorder buffer tag locating the instruction within reorder buffer 32 is conveyed upon an operand tags bus 60A. One operand data value and one operand tag are provided for each source operand of the instruction upon operand data bus 58A and operand tags bus 60A, respectively. Additionally, validity indicators are asserted for each data and tag value by reorder buffer 32, such that reservation station 22A may discern which is being provided for a particular operand (e.g. data or reorder buffer tag).

In addition to providing operand values and tags, reorder buffer 32 provides an instruction tag for the instruction being dispatched to reservation station 22A upon an instruction tag bus 62A. The instruction tag identifies the storage location within reorder buffer 32 which stores information regarding the instruction. The instruction tag is conveyed upon result bus 38A (one of result buses 38 shown in FIG. 1) when the instruction is executed, such that the corresponding instruction result may be stored within reorder buffer 32. In one embodiment, instruction tag bus 62A conveys a line tag identifying the line of storage which stores the instruction information. The offset tag is a constant which is inherent in the issue position to which the instruction is conveyed. In other words, functional unit 24A provides results which are always stored at a particular offset within the lines of storage within reorder buffer 32.

In addition to storing the operand values and tags corresponding to an instruction, reservation station 22A receives the decoded instruction provided by opcode decode unit 44A. When each of the source operand values corresponding to the instruction have been provided by reorder buffer 32 or have been captured from result buses 38, the instruction may be selected for execution by functional unit 24A. Upon selecting the instruction for execution, reservation station 22A conveys the decoded instruction and corresponding operands to functional unit 24A.

Functional unit 24A executes instructions received from reservation station 22A and conveys the instruction tag corresponding to the instruction upon result bus 38A in addition to the instruction result generated therein. In one embodiment, the instruction tag is forwarded as the instruction begins execution but reorder buffer 32 does not receive the corresponding instruction result until the clock cycle following instruction execution. The instruction tag may be forwarded in this manner because it is unchanged during instruction execution, whereas the instruction result must be generated by functional unit 24A and then forwarded. It is noted that result bus 38A is coupled to reservation stations 22 (such as reservation station 22A shown in FIG. 3) for providing forwarded results thereto. Still further, result bus 38A is coupled to load/store unit 26. Functional unit 24A provides the logical address of a memory operation specified by the instruction being executed therein to load/store unit 26 via result bus 38A.

Functional unit 24A additionally forwards a result status upon a result status bus 64A to reorder buffer 32. The result status indicates any exceptions associated with the instruction, such that reorder buffer 32 may take appropriate corrective actions. Corrective actions may include hardware supported correction, trapping to a microcode routine within MROM unit 34, or trapping to a software routine stored at a particular address identified for the instruction. Result status bus 64A may additionally be used to indicate execution of a branch instruction which is mispredicted.

Reorder buffer 32 interfaces to load/store unit 26 to allow completion of load/store memory operations. Load/store unit 26 may be configured to speculatively execute load and store memory operations which hit in data cache 28. Load memory operation results (along with a reorder buffer tag including both line tag and offset tag portions) are conveyed upon an LS results bus 66 to reorder buffer 32. Additionally, the load results are forwarded to reservation stations 22 in order to provide operands thereto. In one embodiment, up to two results may be provided upon LS results bus 66.

Load/store unit 26 may be configured not to speculatively perform memory operations which miss data cache 28. Reorder buffer 32 indicates upon retire pointers bus 68 which memory operations are otherwise in position to be retired but have not yet executed. Load/store unit 26 then performs the indicated memory operations and returns results upon LS results bus 66. Additionally, load/store unit 26 asserts a corresponding signal upon a done bus 70. Reorder buffer 32 recognizes the asserted done signal as a completion of the memory operation indicated upon retire pointers bus 68. Since load/store unit 26 may execute up to two memory operations concurrently according to one embodiment, retire pointers bus 68 may carry up to two reorder buffer tags. Accordingly, done bus 70 includes two done signals corresponding to each of the reorder buffer tags.

A cancel bus 72 is included between reorder buffer 32 and load/store unit 26 as well. Cancel bus 72 includes a signal for each reorder buffer tag conveyed upon retire pointers bus 68. If the corresponding cancel signal is asserted, then reorder buffer 32 is indicating that the corresponding memory operation should be deleted from load/store unit 26. Memory operations are deleted when they are subsequent to a mispredicted branch or an instruction which experienced an exception, for example.

Reorder buffer 32 interfaces with MROM unit 34 and FPU 36 via MROM interface 74 and FPU interface 76, respectively. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 32 informs MROM unit 34 via MROM interface 74. MROM interface 74 performs branch misprediction recovery for such mispredicted branch instructions.

Since FPU 36 operates as a coprocessor, several signals are used to synchronize completion of an instruction within FPU 36. These signals are included within FPU interface 76. The signals within FPU interface 76 are discussed in more detail below in reference to FIG. 10. Generally, a signal may be asserted to FPU 36 indicating that a particular floating point instruction may be retired. When the floating point instruction is retired, FPU 36 asserts a second signal. Additionally, upon detection of a floating point synchronization instruction, another set of signals are asserted to synchronize the completion of the instruction.

Instructions are retired from reorder buffer 32 in program order. Upon retirement, the corresponding register results are conveyed upon a retire bus 78 to register file 30. As noted above, the instructions within a line of storage are retired simultaneously. Since more than one instruction within the instructions may update the same register, reorder buffer 32 employs a set of bits within each line referred to as the last in line (LIL) bits. The LIL bits are set for each instruction which is the last instruction within the line to update a particular register. One bit is included for each portion of the register (i.e. EAX, AH, and AL, wherein AX is represented by both AH and AL being set). Effectively, these bits act as byte enables for updating the register. Therefore, an instruction which updates AH and another instruction which updates AL may retire simultaneously. For embodiments employing a microprocessor architecture which does not allow updates to only a portion of a register, one LIL bit is included for each instruction.

Finally, reorder buffer 32 employs a stall line 80 for stalling instruction dispatch. Instruction dispatch may be stalled for many reasons, including: reorder buffer, reservation station, or load/store buffer full conditions; a narrow to wide stall; instruction serialization; etc. Upon detection of a stall condition, reorder buffer 32 asserts a stall signal upon stall line 80. If decode unit 20A receives an asserted stall signal during a clock cycle and decode unit 20A is attempting to dispatch an instruction, decode unit 20A provides that same instruction during a subsequent clock cycle. In this manner, an instruction which cannot be dispatched during a particular clock cycle is continuously redispatched until the stalling condition terminates.

Figure 4:
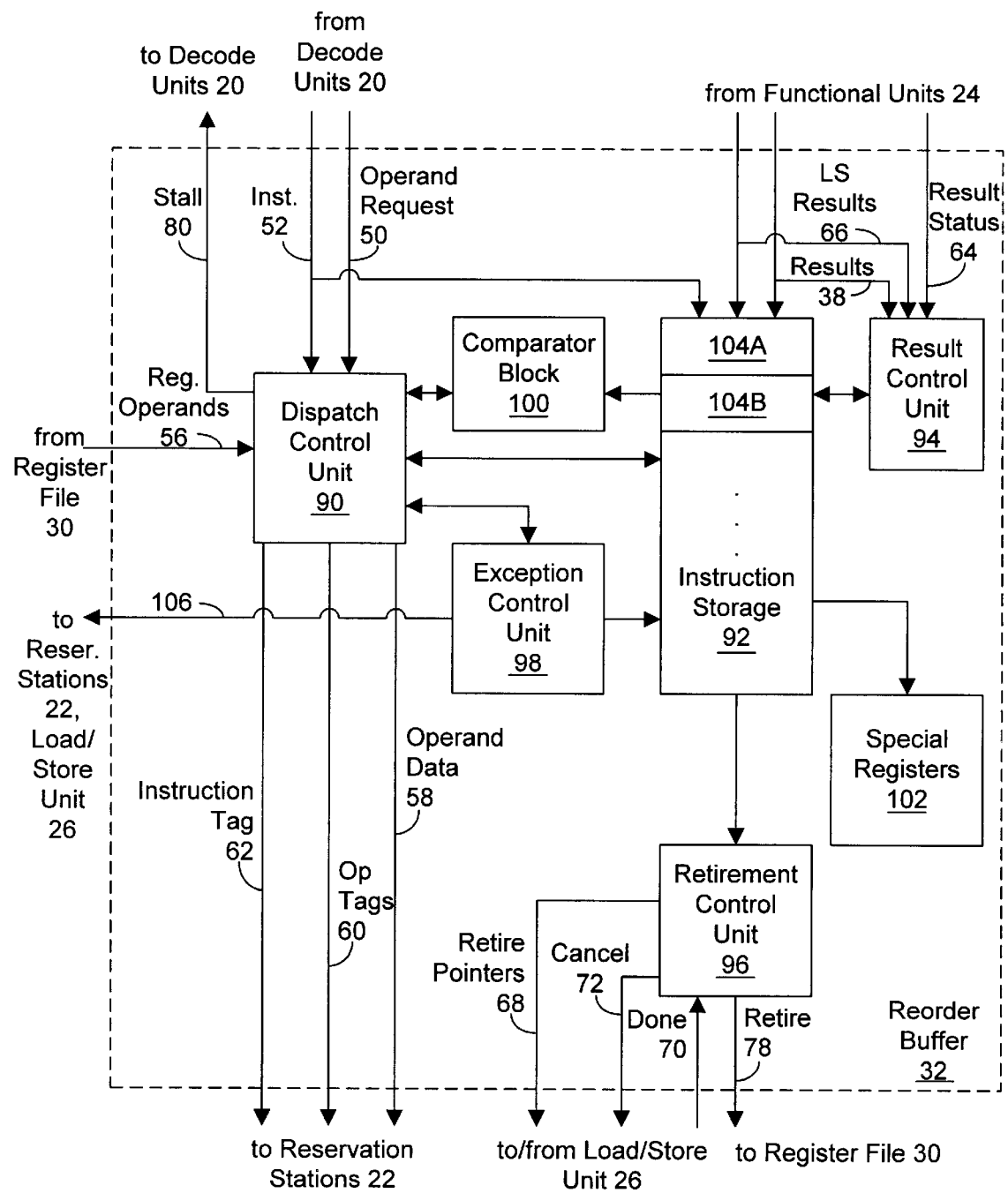
FIG. 4 is a block diagram of one embodiment of the reorder buffer shown in FIG. 1.

Turning now to FIG. 4, a block diagram of one particular embodiment of reorder buffer 32 is shown. Other particular embodiments are contemplated as well. As shown in FIG. 4, reorder buffer 32 includes a dispatch control unit 190, an instruction storage 192, a result control unit 94, a retirement control unit 196, an exception control unit 98, a comparator block 100, and a special registers block 102. Buses which are suffixed in FIG. 3 with an "A" are shown in FIG. 4 without the "A" to represent the bus from decode unit 20A as well as similar buses from decode units 20B–20C. For example, operand request bus 50 includes operand request bus 50A as well as an operand request bus 50B from decode unit 20B and an operand request bus 50C from decode unit 20C.

Dispatch control unit 190 is coupled to exception control unit 98, instruction storage 192, and comparator block 100. Comparator block 100 is further coupled to instruction storage 192, as is exception control unit 98. Result control unit 94, retirement control unit 196, and special registers block 102 are coupled to instruction storage 192 as well.

Dispatch control unit 190 receives instruction information and corresponding operand identifiers upon instruction buses 52 and operand request buses 50, respectively. Furthermore, corresponding immediate data (if any) is received upon immediate buses 51. Upon receipt of at least one valid instruction from decode units 20, dispatch control unit 190 allocates a line of storage within instruction storage 192. Instruction storage 192 includes multiple lines of storage, such as lines 104A and 104B shown in FIG. 4. The instruction information received upon instruction bus 52 is stored into the line of storage, as well as an indication of the destination operand of the instruction. Dispatch control unit 190 provides the line tag identifying the allocated line of storage upon instruction tag bus 62 to reservation stations 22. Reservation stations 22 may thereby identify the line of storage 104 which stores the instruction, and the offset tag is inherent in the issue position of the receiving reservation station 22A–22C.

Dispatch control unit 190 further provides dependency checking for each source operand. Comparator block 100 is provided for performing dependency checking. A comparator within comparator block 100 is assigned to each destination operand which may be stored within instruction storage 192 and to each source operand which may be requested upon operand request buses 50. The comparator compares the destination operand to the source operand to detect any dependencies with instructions outstanding within reorder buffer 32. Because x86 instructions allow a portion of a register to be updated and accessed, the comparators compare not only the register identifiers but the respective sizes of the updates. If a dependency is detected, the corresponding reorder buffer tag (i.e. both line tag and offset tag) is forwarded upon operand tags bus 60. Additionally, if an instruction result has been provided for the instruction upon which the dependency is detected, the result is provided upon operand data bus 58. If no dependency is detected, the register file value provided upon register operands bus 56 is provided upon operand data bus 58.

In one embodiment, instruction storage 192 stores a last-in-buffer indication for each instruction. The last-in-buffer indication indicates whether or not the instruction is the last (in program order) within the buffer to update the destination operand of that instruction. Comparators within comparator block 100 include the last-in-buffer indication in their comparisons, such that only the last instruction is detected as a dependency. Since only the correct dependency is identified by comparator block 100 (as opposed to all instructions within the buffer which update the same destination), logic which determines the correct dependency from the comparator outputs may be simplified. Additionally, since one of the source operands is also the destination, resetting the last-in-buffer indication when a new instruction is dispatched requires little extra logic. When the comparator corresponding to a particular instruction within instruction storage 192 asserts its output signal and the source operand being compared is also the destination of the instruction being dispatched, the last-in-buffer indication of that particular instruction is reset. The last-in-buffer indication is set for each instruction dispatched.

For embodiments employing the x86 instruction set, three types of dependencies may exist: an equal-sized dependency, a narrow-to-wide dependency, and a wide-to-narrow dependency. An equal-sized dependency exists if both the source operand and the destination operand being compared update the same portion of the same register. A narrow-to-wide dependency exists if the source operand accesses a larger portion of the register than the destination operand updates. Conversely, a wide-to-narrow dependency exists if the source operand accessed a smaller portion of the register than the destination operand updates. Equal-sized dependencies and wide-to-narrow dependencies may be handled by forwarding the destination operand's reorder buffer tag or result value. Narrow-to-wide dependencies are somewhat more problematic, since the instruction corresponding to the destination operand does not provide the entire value used by the source operand. Dispatch control unit 190 may stall the instruction corresponding to the narrow-to-wide dependency for such embodiments via assertion of a stall signal upon stall line 80. The stall signal may remain asserted until the destination operand is retired or discarded from instruction storage 192.

Instruction results are provided by functional units 24 upon result buses 38, while load/store unit 26 provides load memory operation results upon LS results bus 66. Result control unit 94 examines the reorder buffer tags provided by functional units 24 and load/store unit 26 to determine which lines of storage and which instructions within the lines receive the results. As noted above, functional units 24 provide a line tag only. The offset tag is a constant for each functional unit. However, load/store unit 26 is not associated with a fixed, symmetrical issue position in the manner of functional units 24. Therefore, load/store unit 26 provides both the line tag and the offset tag for each result. Result control unit 94 directs instruction storage 192 to store each result in the appropriate line and offset.

Additionally, result control unit 94 receives an exception status for each instruction upon result status bus 64. If a functional unit 24 or load/store unit 26 reports an exception while executing an instruction, result control unit 94 stores the exception status into instruction storage 192 at the line and offset storing the corresponding instruction. Result control unit 94 may also signal exception control unit 98 directly regarding certain exceptions (e.g. branch misprediction), such that recovery may begin. Alternatively, exception control unit 98 may detect other exceptions as the corresponding instructions are retired from instruction storage 192.

Retirement control unit 196 is configured to retire instructions from instruction storage 192. Generally, the instructions within a line of storage 104 are retired simultaneously. Additionally, instructions are retired in program order. Therefore, retirement control unit 196 monitors the line of storage 104 storing the instruction which is foremost in program order among the instructions within instruction storage 192 (the "oldest line"). When each of the instructions within the oldest line have been executed and provided results, the instructions are retired. Instruction results which update register file 30 are conveyed upon retire bus 98 along with the corresponding last-in-line bits. The line of storage is then deallocated, freeing storage space for a set of concurrently dispatched instructions.

Retirement control unit 196 further scans the instructions within instruction storage 192 to detect load/store memory operations which have not yet completed and which are no longer speculative. A load/store memory operation is no longer speculative if the instructions prior to the instruction corresponding to the load/store memory operation have completed without exception. Retirement control unit 196 conveys the reorder buffer tag of the instruction corresponding to the non-speculative load/store memory operation upon retire pointers bus 68 to load/store unit 26. Load/store unit 26 may subsequently select the memory operation for access to data cache 28. Upon completion of the memory operation, load/store unit 26 asserts a done signal upon done bus 70. Retirement control unit 196 may then mark the corresponding memory operation as completed within instruction storage 192. If the remaining instruction operations associated with the instruction corresponding to the completed memory operation have also been performed, the instruction is ready for retirement.

Retirement control unit 196 may further operate signals upon cancel bus 72 in conjunction with retire pointers bus 68. If an instruction corresponding to a load/store memory operation has been canceled (due to exception conditions), the cancel signal is asserted when the reorder buffer tag of the instruction is conveyed upon retire pointers bus 68. Load/store unit 26 discards the identified memory operation and asserts the corresponding done signal. Alternatively, exception control unit 98 may operate the cancel signals.

Upon retirement of instructions which update special registers within special registers block 102, the special registers are updated. In one embodiment, the special registers within special registers block 102 include: the program counter register, which stores an address indicative of the last instruction to be retired; an MROM program counter register, which stores a ROM address indicative of the last retired instruction from MROM unit 34; a floating point program counter register, which stores an address indicative of the last floating point instruction to be retired; recovery registers for the program counter and ESP for use with branch and CALL/RETURN instructions whose targets experience a segment limit violation; the flags registers; a floating point opcode register storing the opcode of the last floating point instruction to be retired; and a debug register.

Exception control unit 98 handles recovery from exceptions experienced by microprocessor 10. An exceptions control bus 106 is provided by exception control unit 98 to indicate exceptions and corrective actions to reservation stations 22 and load/store unit 26. Any suitable set of corrective actions may be performed.

In one embodiment, branch misprediction exception recovery begins upon detection of the branch misprediction, while exception recovery for other exceptions begins upon retirement of the corresponding instruction. Branch misprediction recovery may be performed in many ways. For example, exception control unit 98 may provide the reorder buffer tag of the branch instruction upon exceptions control bus 106. Instructions subsequent to the branch instruction are discarded by comparing the corresponding reorder buffer tags to the branch instruction tag. For this method, reservation stations 22 and load/store unit 26 must be able to determine program order from the values of the reorder buffer tags. As another example, exception control unit 98 may assert a branch misprediction signal upon exceptions control bus 106. Reservation stations 22 and load/store unit 26 may note the instructions which are stored therein upon receipt of the asserted signal. Subsequently, exception control unit 98 may indicate that the mispredicted branch instruction is retired. Instructions remaining within reservation stations 22 and load/store unit 26 upon receipt of the retirement indication may then be discarded if the instructions are noted as stored therein upon detection of the mispredicted branch. Other instructions which arrived subsequent to detection of the mispredicted branch are from the corrected path and therefore are retained. In yet another example, load/store memory operations subsequent to the mispredicted branch in program order may be canceled via cancel bus 72. Random data may be forwarded for the canceled load memory operations, and other instructions which are subsequent to the mispredicted branch may be allowed to execute and forward results. The instructions are then discarded by reorder buffer 32.

In addition to causing instruction discard in other portions of microprocessor 10, exception control unit 98 directs dispatch control unit 98 to "redispatch" the instructions within instruction storage 192 which are prior to the mispredicted branch in program order. Since instructions subsequent to the mispredicted branch instruction may be indicated to be last-in-buffer updates to one or more registers, this "redispatch" allows the dependency checking logic of dispatch control unit 190 to recover the state of the last-in-buffer indications for the instructions prior to the mispredicted branch. The "redispatch" is performed internal to reorder buffer 32 (i.e. other portions of microprocessor 10 are unaffected). In one embodiment, dispatch control unit 190B begins with the oldest line of instructions and redispatches each line of instructions up to and including the line of instructions including the mispredicted branch instruction (save the instructions within the line which are subsequent to the mispredicted branch instruction).

In another embodiment, redispatch begins with the line of instructions including the mispredicted branch instruction and proceeds in inverse program order. If an update to a register is detected, the LIB bits are set appropriately. Additionally, dispatch control unit 190 notes that the LIB bits for that register have been set during the recovery. Updates to that register (or portion thereof) are ignored in subsequent redispatches since the redispatch is proceeding in inverse program order. This embodiment has the advantage that lines of instructions prior to the mispredicted branch which are retired prior to the completion of mispredicted branch recovery are not redispatched. Branch misprediction recovery may thereby complete in fewer clock cycles than other branch misprediction recovery mechanisms.

Figure 5:
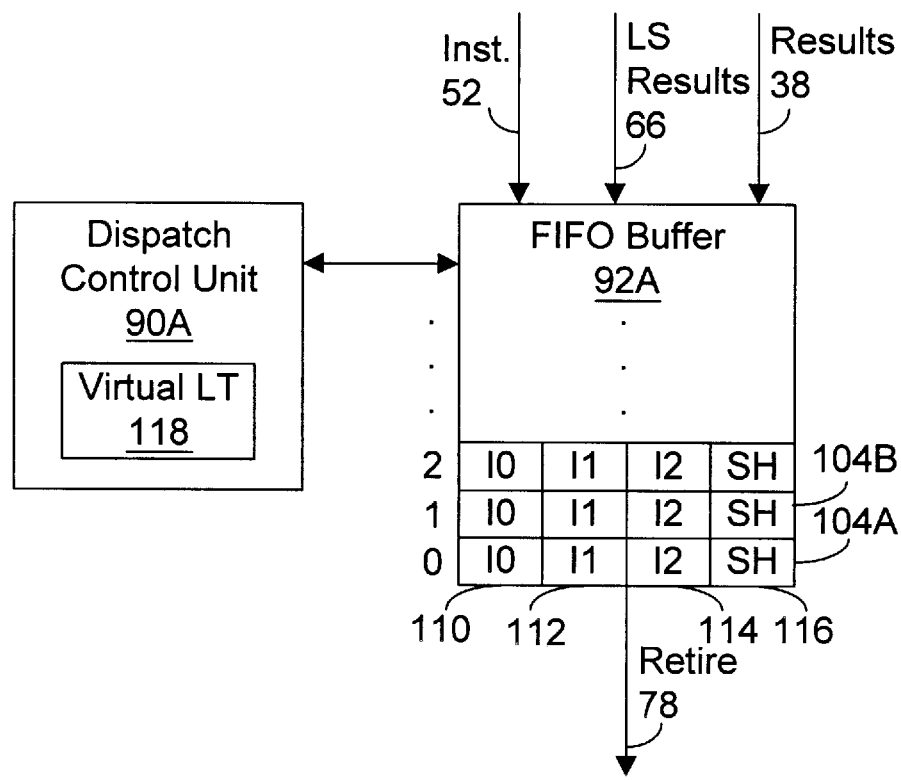
FIG. 5 is a block diagram of a dispatch control unit and a FIFO buffer according to one embodiment of the reorder buffer shown in FIG. 4.

Turning now to FIG. 5, a block diagram depicting one implementation of instruction storage 192 is shown. The implementation shown in FIG. 5 is a first-in, first-out (FIFO) buffer 192A. Additionally, an embodiment of dispatch control unit 190 (dispatch control unit 190A) is shown.

A FIFO buffer generally comprises multiple storage locations which operate as a queue. As the name implies, the first item placed in a FIFO buffer is the first item to be removed from the buffer. The "items" for FIFO buffer 192A comprise lines of instructions. For example, the embodiment of FIFO buffer 192A illustrated in FIG. 5 stores up to three instructions per line. Therefore, each line of storage includes a first instruction (10) field 110, a second instruction (11) field 112, and a third instruction (12) field 114. Additionally, certain information which is shared by the instructions in the line is stored in a shared (SH) field 116. A line of storage 104 is allocated to one or more concurrently dispatched instructions by dispatch control unit 190A. Although the line of storage 104 shown in this implementation includes up to three instructions, other embodiments of FIFO buffers or instruction storages may include any number of instructions greater than one.

FIFO buffer 192A shifts the lines of instructions stored therein such that the oldest line of instructions is in the bottom storage location of FIFO buffer 192A (e.g. the location labeled zero in FIG. 5). The "bottom" of a FIFO buffer is the storage location which is defined to store the item which is next to be removed from the FIFO buffer. When the item at the bottom is removed, the remaining items are shifted within the FIFO buffer such that the item which was second to the bottom of the FIFO buffer becomes the item stored at the bottom. For FIFO buffer 192A, each time a line of instructions is retired, FIFO buffer 192A is shifted such that the line of instructions which was next to the bottom of FIFO buffer 192A becomes the line of instructions stored at the bottom. In this manner, the storage location which is defined to be the bottom of FIFO buffer 192A is the only storage location accessed by retirement control unit 76 in order to retire instructions.

Dispatch control unit 190A allocates a storage location within FIFO buffer 192A for each set of concurrently dispatched instructions received by reorder buffer 32. When FIFO buffer 192A is empty, dispatch control unit 190A allocates location zero. If location zero is occupied and location one is empty, location one is allocated. Similarly, other locations within FIFO buffer 192A are allocated if all the locations between that location and the bottom of FIFO buffer 192A are occupied with instructions. The location numbers shown in FIG. 5 next to FIFO buffer 192A are therefore physical line tags which identify one line of storage within FIFO buffer 192A from the other lines of storage within FIFO buffer 192A.

Because instruction information and results are shifted between lines of storage 104 within FIFO buffer 192A, physical line tags are unsuitable for use in identifying a particular instruction. The physical line tag changes as instructions are retired from FIFO buffer 192A. Therefore, dispatch control unit 190A assigns a virtual line tag to a set of concurrently dispatched instructions. The virtual line tag is stored in the shared field 116 of the line of storage allocated to the instructions. As the line of instructions is shifted between lines of storage 104 within FIFO buffer 192A, the virtual line tag is moved along as well. Therefore, result control unit 94 may search the virtual line tags stored within FIFO buffer 192A in order to locate the line of storage 104 storing an instruction for which a result is being provided.

Dispatch control unit 190A includes a storage location 118 which stores the virtual line tag to be allocated to the next set of concurrently dispatched instructions received by reorder buffer 32. When dispatch control unit 190A allocates a line of storage to the set of concurrently dispatched instructions, the virtual line tag stored in storage location 118 is incremented. If lines of instructions are discarded due to branch misprediction, the virtual line tag may be reset to the virtual line tag subsequent to the virtual line tag assigned to the mispredicted branch instruction. The virtual line tag is the tag conveyed to reservation stations 22, load/store unit 26, and any other portions of microprocessor 10 which receive reorder buffer tags.

Figure 6:
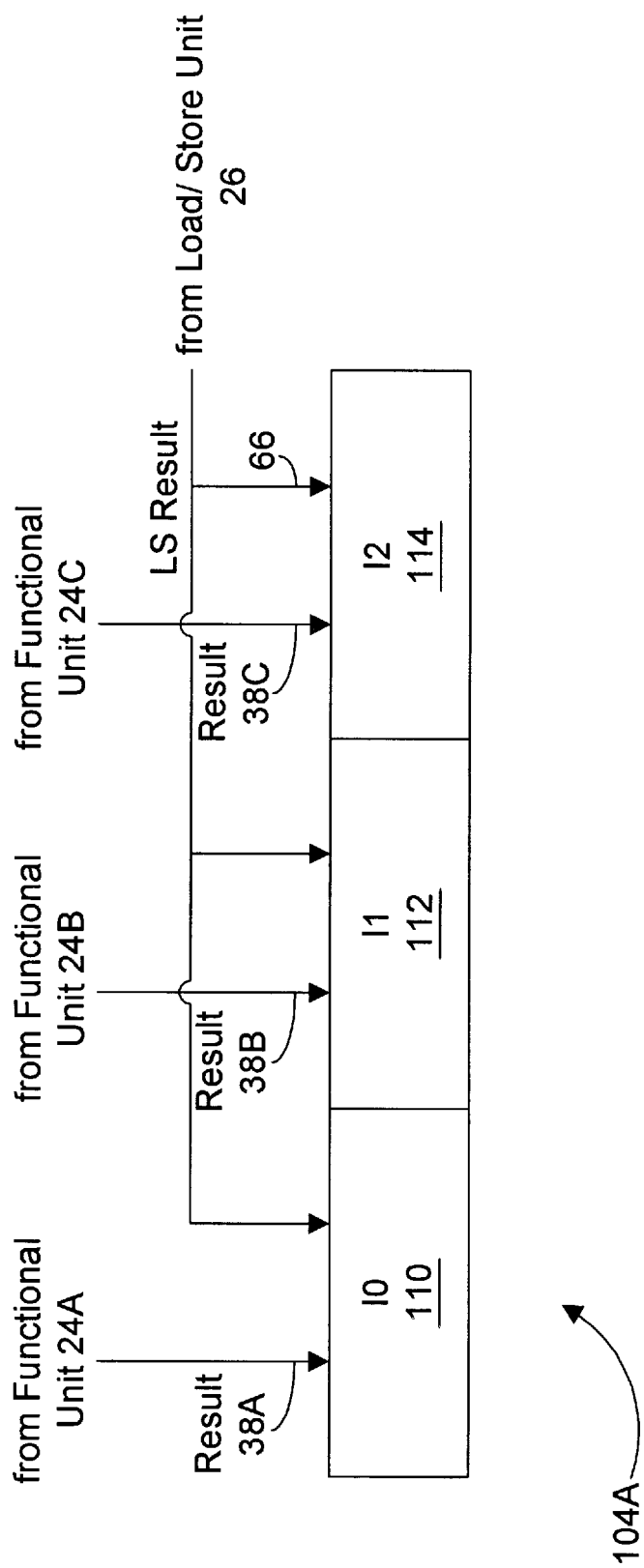
FIG. 6 is an illustration of the result buses connected to portions of a line of storage depicted in FIG. 5, according to one embodiment of a line of storage.

Turning next to FIG. 6, an illustration of the connection of results buses 38 and LS result buses 66 to an exemplary line of storage 104A is shown. Result bus 38A from functional unit 24A, result bus 38B from functional unit 24B, and result bus 38C from functional unit 24C are shown. Because microprocessor 10 employs fixed issue positions and because an instruction field 110–114 corresponds to a particular issue position, each result bus 38 connects to a particular instruction field 110–114 within each line of storage. In other words, results provided upon result bus 38A are stored into first instruction field 110; results provided upon result bus 38B are stored into second instruction field 112; and results provided upon result bus 38C are stored into third instruction field 114.

FIG. 6 illustrates that functional units 24 need only provide a line tag to reorder buffer 32 upon result buses 38. The offset within the line (i.e. the particular instruction within the line of instructions), is inherent in the bus upon which the result arrives. Result control unit 196 uses the line tag to identify the line of storage to be updated, and the instruction field within the line is automatically located as the only instruction field to which the particular result bus 38A–38C may provide a value.

It is noted that, by configuring microprocessor 10 with multiple fixed, symmetrical issue positions, microprocessor 10 may be more likely to dispatch larger numbers of instructions concurrently than microprocessors having asymmetrical issue positions and line-oriented reorder buffers. Since the symmetrical issue positions execute the same subset of instructions, any random group of instructions within the subset may be dispatched to and executed concurrently by the symmetrical issue positions. Conversely, asymmetrical issue positions are limited to certain groups of instructions within the subset of instructions executed by the asymmetrical issue positions as a whole. For example, if several instructions are eligible for concurrent dispatch, but only one of the asymmetrical issue positions is configured to execute the several instructions, then typically only one of the several instructions may be dispatched at a time. Even if the issue position is configured to receive multiple dispatched instructions concurrently, the issue position may only execute the instructions one at a time. Therefore, the fixed, symmetrical issue positions configured into microprocessor 10 operate in conjunction with the lines of storage within reorder buffer 32 to provide high instruction dispatch and execution rates.

Load/store unit 26, on the other hand, does not correspond to a particular fixed issue position. Load/store unit 26 therefore provides both a line tag and an offset tag upon LS result buses 66. LS result buses 66 are coupled to each field of the lines of storage, thereby allowing results provided by load/store unit 26 to update any instruction field. The particular instruction field updated by a particular result is identified by the offset tag conveyed therewith.

Figure 7:
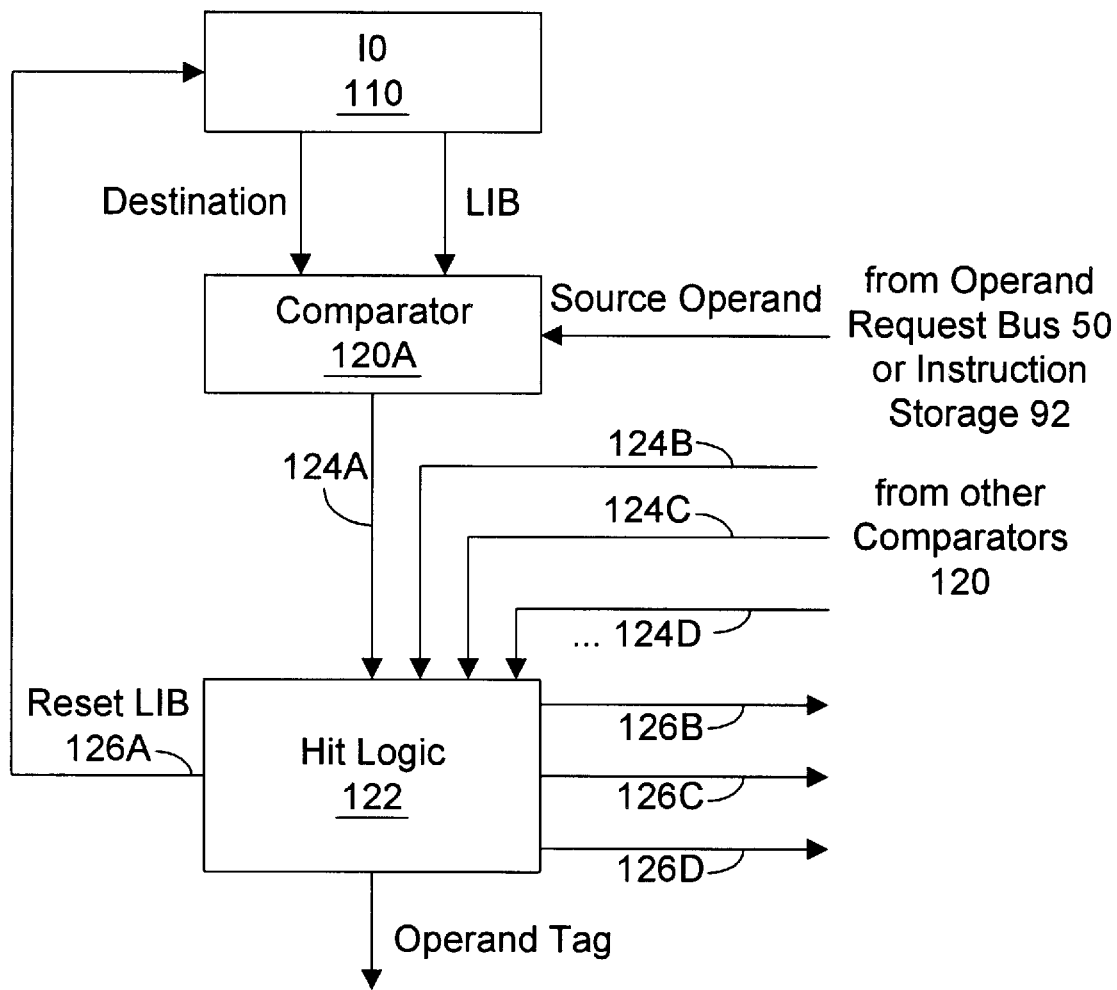
FIG. 7 is a block diagram of a portion of the dependency checking logic employed by one embodiment of the reorder buffer shown in FIG. 4.

Turning to FIG. 7, a block diagram of a portion of the dependency checking logic employed by one embodiment of reorder buffer 32 is shown. First instruction field 110 from line of storage 104A is shown, as well as a comparator 120A and a hit logic block 122. Comparator 120A receives the destination operand identifier from instruction field 110, as well as the last-in-buffer (LIB) indication. Additionally, comparator 120A receives a source operand identifier from operand request bus 50 (or from instruction storage 192, if branch misprediction recovery is being performed). Comparator 120A includes an output line 124A connected to hit logic block 122. Output line 124A is asserted if the destination operand identifier and the source operand identifier compare equal and the LIB indication is set. If the operand identifiers do not compare equal or the LIB indication is not set, output line 124A is deasserted.

Hit logic block 122 receives output line 124A as well as other output lines 124 (such as output lines 124B, 124C, and 124D shown in FIG. 7, among others). The output lines 124 received by hit logic block 122 emanate from comparators 120 which receive the same source operand identifier from operand request bus 50. Since the LIB indicator is included in comparators 120, only zero or one of output lines 124 is asserted for a particular dependency check. Hit logic 122 may therefore select the reorder buffer tag corresponding to the one asserted output line 124 for conveyance as the operand tag. No prioritization logic need be included within hit logic 122. For example, hit logic 122 may effectively comprise a multiplexer having reorder buffer tags as inputs and output lines 124 as selection controls.

Hit logic block 122 may additionally be configured to reset the LIB indication for an instruction if the source operand for which hit logic block 122 provides dependency information is also the destination operand. For example, if hit line 124A is asserted and comparator 120A receives a source/destination operand, hit logic 122 asserts a reset LIB line 126A to instruction field 110. Additional reset LIB lines 126 may be conveyed to other instruction fields corresponding to other comparators 120. It is noted that comparator output signals 124 may comprise reset LIB lines 126, since only the instruction for which the LIB indication is set is indicated as comparing equal.

It is further noted that, for embodiments employing the x86 microprocessor architecture, operand size information must be taken into account as well. The type of dependency (e.g. equal-sized, wide-to-narrow, or narrow-to-wide) is determined as well for such embodiments, as described above.

Turning now to FIG. 8, a list 130 of exemplary information stored in an instruction field 110–114 according to one specific implementation of reorder buffer 32 is shown. Additional, substitute, or alternative information may be stored by other embodiments. Information having a bit encoding suffixed thereto is multi-bit information. Otherwise, a single bit is used.

The instruction result is stored in the instruction field, and a result valid bit indicates whether or not the instruction result has been provided. Similarly, any flag bits which are updated are stored the instruction field. The branch indication is set if the instruction is a branch. The LS_Sync bit is set if a load/store resync is needed. A load instruction may need resynchronization (i.e. refetch and reexecution of the instruction and subsequent instructions in program order) if the load instruction is performed out of order and a snoop hit is detected on the address accessed by the load instruction prior to retirement of the load instruction. Store instructions which update instruction code which is outstanding within microprocessor 10 are also detected, causing a setting of the LS Sync bit. Instructions following the store instruction for which the bit is set are refetched and reexecuted. The SBZ bit indicates, when set, that a shift by zero is performed for the corresponding instruction. Shift by zero is a defined exception for x86 instructions. Exception and breakpoint information corresponding to the instruction is stored as well.

As mentioned above, last-in-line (LIL) and last-in-buffer (LIB) information is stored for each instruction. LIL and LIB information corresponds to the destination register, while FLIL and FLIB correspond to the flags register. Four LIB bits are used, one bit corresponding to each portion of the destination register which may be selected by an instruction. The LIB bit to be used in the dependency comparison may be selected according to the size of the source operand being compared. In this manner, an update to the AH register, for example, does not interfere with an access to the AL register. Four FLIB bits are used as well, except that the four FLIB bits correspond to four groups of flag bits. A first group includes the S, Z, P, and A bits; a second group is the O bit; a third group is the D bit; and a fourth group is the C bit. Similar to the FLIB bits, the FLIL bits correspond to each of four groups of flags. The groups are chosen based upon the manner in which the x86 instruction set updates the flags.

The LIL bits are used as enables for updating register file 30. Therefore, one LIL bit indicates that the most significant two bytes of the destination register are updated by the instruction corresponding to this instruction field; a second LIL bit indicates that byte 1 (e.g. AH) is updated by the instruction; and a third LIL bit indicates that byte 0 (e.g. AL) is updated by the instruction.

The cancel bit, when set, indicates that the instruction has been canceled. An instruction is canceled if it is subsequent to a mispredicted branch. An instruction having the cancel bit set does not update register file 30.

The destination specifier is stored for each instruction, as well as a destination valid bit. The destination specifier may be invalid, for example, when the destination operand of the instruction is a memory location. WRFL[3:0] is used to indicate which flag groups are updated by the instruction. Similar to the LIL bits, Size[2:0] encodes the size of the destination operand. End byte[3:0] stores the least significant four bits of the address at which the last byte of the instruction is stored. End byte[3:0] may be used in conjunction with a program counter field described below to calculate an address for the program count register upon retirement of the instruction. The CRET bit is set if the instruction is a CALL or RETURN instruction. PC_Sel indicates which of two program counter values stored in shared field 116 corresponds to the instruction. If PC_Sel is clear, the first program counter value is selected. Otherwise, the second program counter value is selected. Similarly, the Sel_eflg field indicates which of two flags registers should be updated by this instruction. MROM instructions have a flags register dedicated for their use in addition to the architecturally defined flags register.

The INT_ENB bit, when set, indicates that the instruction may cause an interrupt. Instructions dispatched from MROM unit 34 cannot cause an interrupt, while fast path instructions may. The store bit is set if the instruction performs a store memory operation. Similarly, the WSR bit is set if the instruction updates a special register. The Null bit is set if the instruction field is not storing a valid instruction.

The Null bit may be set for instruction fields which did not receive an instruction upon allocation of the line of storage (i.e. less than the maximum number of concurrently dispatchable instructions was dispatched). Alternatively, an entry may be nullified if an exception is detected. The exit bit is set if the instruction is the last instruction of an MROM instruction sequence of if the instruction is a fast path instruction. Finally, the entry valid bit indicates that the instruction field is storing valid information. The entry valid bit is set if the Null bit is clear and the Cancel bit is clear.

FIG. 9 is a list 132 of exemplary information stored in shared field 116 according to one specific implementation of reorder buffer 32. Additional, substitute, or alternative information may be stored by other embodiments. Information having a bit encoding suffixed thereto is multi-bit information. Otherwise, a single bit is used.

The branch misprediction bit is set if a mispredicted branch is within the line of storage. Otherwise, the branch misprediction bit is clear. CSSEL stores the code segment selector for the line of instructions. The floating point bit is set if the line includes a floating point instruction, and the floating point instruction opcode is stored in FPOPC[10:0]. The FSYNC bit is set if a forced synchronization is performed for this line of storage. Forced synchronizations are performed upon execution of a taken branch instruction which was not detected by branch prediction unit 14. Branch prediction unit 14 is thereby updated with information identifying the taken branch instruction prior to retirement of the taken branch instruction.

The shared field stores up to two program count values per line. PC1 stores the program counter address for the first instruction stored within the line. PC2 stores the address of a split line instruction or the target of a branch instruction. In this manner, instructions for up to two different cache lines may be stored within a single line of storage. In one particular embodiment, instructions from three different cache lines may be stored when the first instruction in the line is a split line instruction and the second instruction is a predicted taken branch instruction. The Last 1bit, Linetag1[4:0], and LineOffset[3:0] correspond to PC1. Similarly, the Last 2 bit, Linetag2[4:0], and LineOffset[3:0] correspond to PC2. The last bit is set if the last instruction in the cache line indicated by the corresponding PC value is within the line of storage. The line tag identifies branch prediction information corresponding to a branch instruction within the line. The branch prediction information may remain stored in branch prediction unit 14, and is updated by communicating the results of the branch instruction along with the line tag to branch prediction unit 14. Branch mispredictions are communicated upon detection of the mispredictions, while correct predictions are updated upon retirement of the corresponding branch instruction. The line offset contains a value which, when added to the corresponding PC value, locates the beginning of the next instruction after the instructions included within the line of storage.

The MROM bit is set if the line of storage contains one or more MROM instructions, and is clear otherwise. The NoMisp bit is set if the line cannot mispredict (i.e. no predicted branch instruction is in the line). The PCSHFT bit is set if the first instruction in the line of storage is a split line instruction (e.g. a portion of the instruction is in one instruction cache line the remainder is in another instruction cache line). If the first instruction is a split line instruction, PC1 corresponds to the cache line storing the remaining portion. PC2 may therefore be used for the target of a branch instruction. Finally, VLTAG[3:0] stores the virtual line tag assigned to the line of storage. VLTAGP1[3:0] stores the virtual line tag plus 1 (for use in resetting storage location 118 shown in FIG. 5 upon detection of a mispredicted branch instruction).

Figure 10:
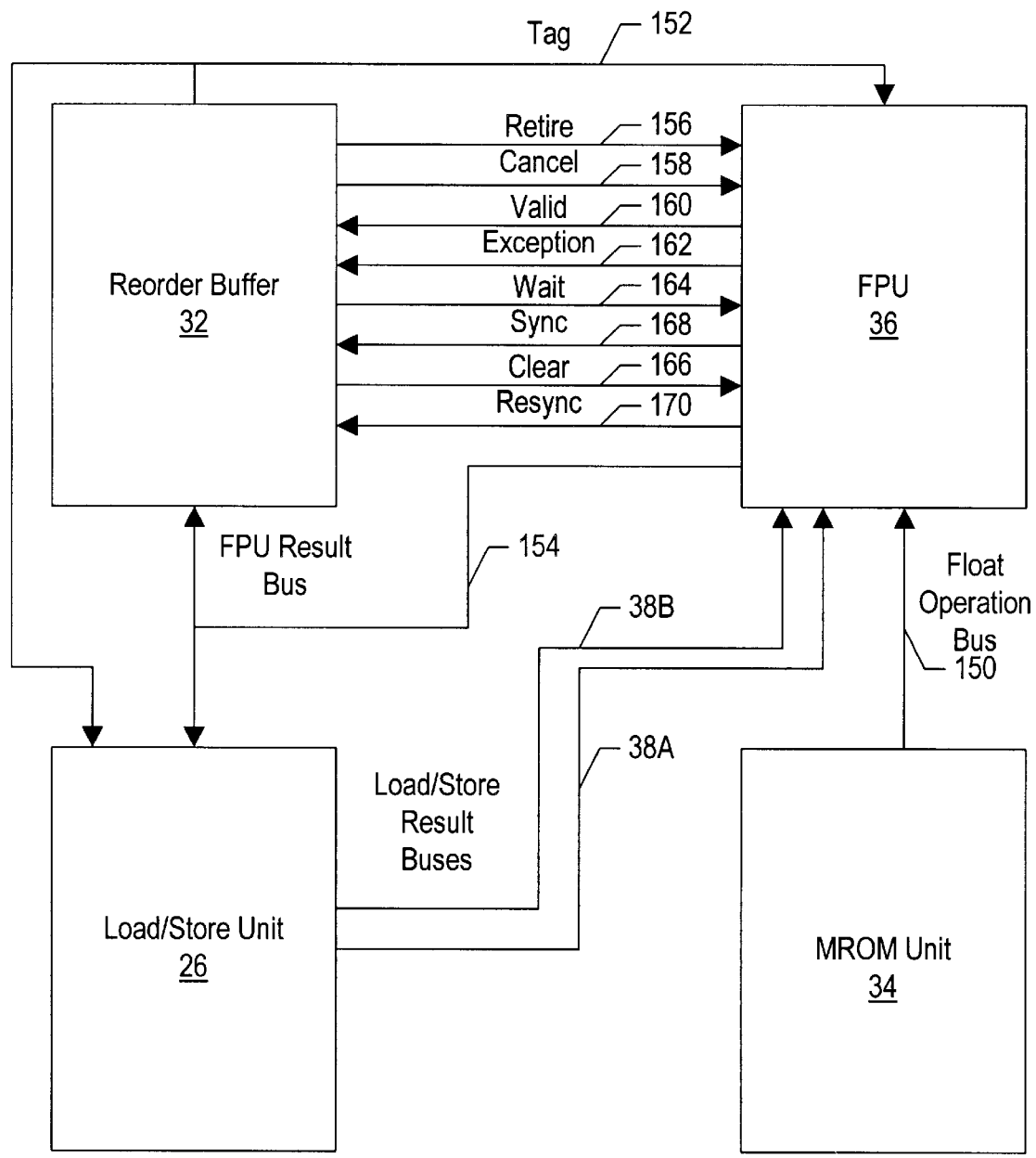
FIG. 10 is a block diagram of a floating point unit, a reorder buffer, a load/store unit, and an MROM unit shown in FIG. 1, highlighting interconnection therebetween according to one embodiment of the microprocessor.

Turning now to FIG. 10, a block diagram of load/store unit 26, reorder buffer 32, FPU 36, and MROM unit 34 is shown. Interconnection between the blocks is highlighted in FIG. 10 according to one embodiment of microprocessor 10. Additional interconnection may be provided as desired according to design choice.

As mentioned above, MROM unit 34 receives floating point instructions from instruction cache 16 and parses the floating point instruction into one or more floating point operations and one or more integer operations, such as memory operations. Memory operations retrieve and store memory operands for the floating point operations. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operations upon a float operation bus 150 coupled between MROM unit 34 and FPU 36. Each floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag, or line tag, assigned to the memory operations upon a tag bus 152 coupled between reorder buffer 32 and FPU 36. According to the present embodiment, reorder buffer 32 is a line-oriented reorder buffer as described above. For such an embodiment, reorder buffer 32 provides the line tag upon tag bus 152. Using the supplied tag, FPU 36 can identify the memory operand data as it is provided from load/store unit 26.

Load/store unit 26 provides memory operand data upon load/store result bus 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a tag identifying the data word. The tag comprises both the line and offset portions. The line portion identifies the floating point instruction to which the data word belongs, and the offset portion defines the portion of the floating point operand being provided by load/store result bus 38. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 154 to load/store unit 26 for storage. Additionally, a floating point instruction is defined which causes a floating point value to be stored into an integer register (specifically, the AX register of the x86 microprocessor architecture, in one embodiment). FPU result bus 154 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an FPU interface 76 (see FIG. 3) between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled FPU interface 76 are shown in FIG. 10. A retire signal is conveyed by reorder buffer 32 upon a retire conductor 156 coupled to FPU 36. Reorder buffer 32 conveys a cancel signal upon a cancel conductor 158 coupled to FPU 36. FPU 36 conveys a valid signal upon a valid conductor 160 and an exception signal upon an exception conductor 162, both of which are coupled to reorder buffer 32. Reorder buffer 32 provides a wait signal upon a wait conductor 164 and a clear signal upon a clear conductor 166, both of which are coupled to FPU 36. Finally, FPU 36 provides a sync signal upon a sync conductor 168 and a resync signal upon a resync conductor 170, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 11:
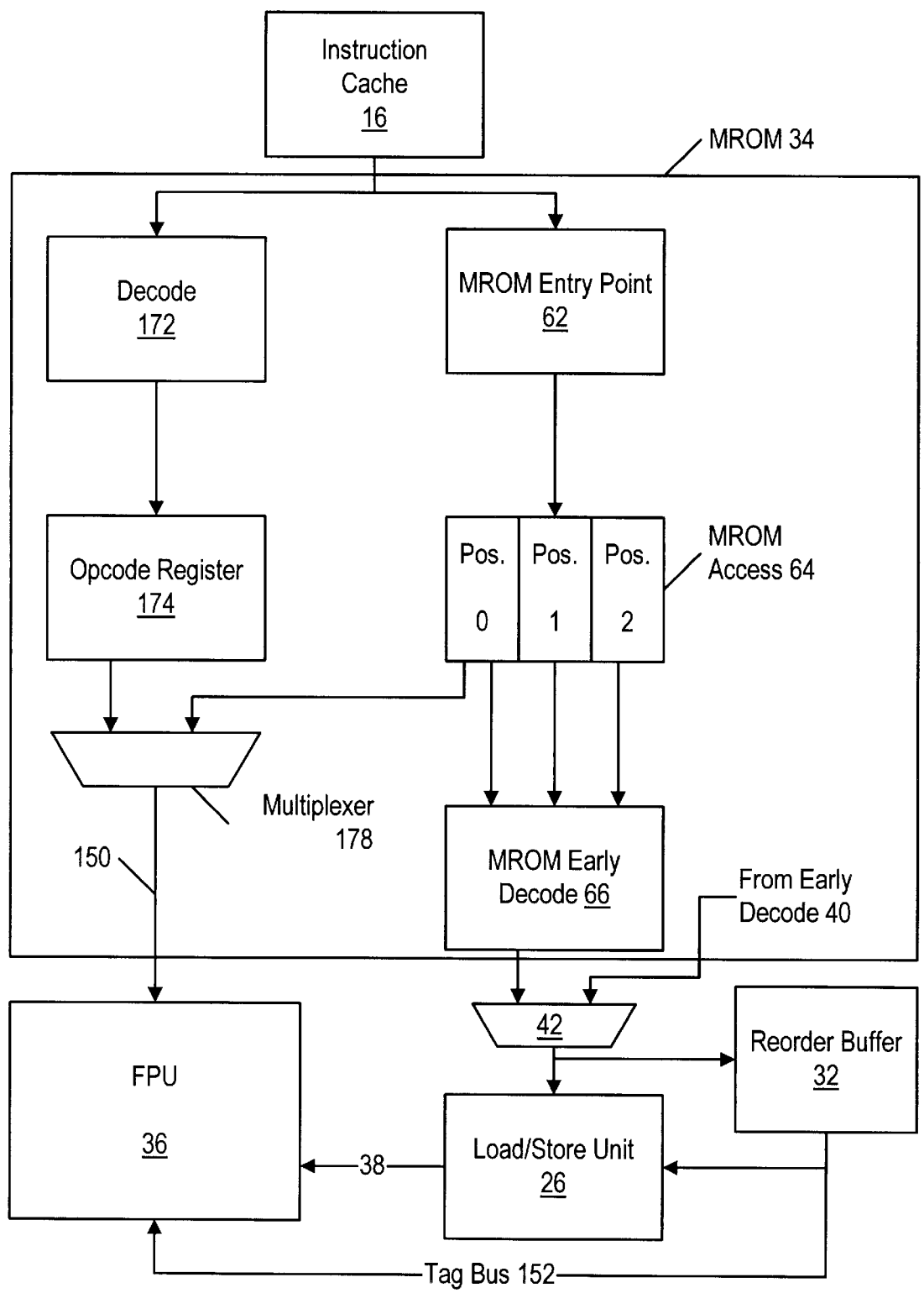
FIG. 11 is a block diagram of a floating point unit, an instruction cache, an MROM unit, and a decode unit shown in FIG. 1, highlighting the implementation of a floating point instruction according to one embodiment of the microprocessor.

Turning now to FIG. 11, a block diagram of a floating point unit, an instruction cache, an MROM unit, and a decode unit is shown. Additional interconnection may be provided as desired according to design choice. An output of instruction cache 16 is coupled to MROM unit 34. Outputs of MROM 34 are coupled to FPU 36, reorder buffer 32 and load/store unit 26. A tag bus 152 of reorder buffer 32 is coupled to FPU 36 and load/store unit 26.

As discussed above, instruction cache 16 is a high speed cache memory for storing instructions fetched from system memory. Microcode instructions from instruction cache 16 are dispatched to MROM unit 34. Floating point instructions are classified as MROM instructions for instruction fetching and dispatch purposes. Within MROM unit 34, floating point instructions are dispatched to both FPU decode 202 and MROM entry point 62. MROM entry point 62 calculates the location, or microaddress, of the first microcode instruction in MROM access 64 that corresponds to the floating point instruction received from instruction cache 16. The microaddress calculated by MROM entry point 62 is the location of the first microcode line that stores the microcode instructions that effectuate the desired operation of the floating point instruction. The microcode instructions that implement a floating point instruction are referred to as "a microcode sequence." The number of microcode instructions required to implement a floating point instruction varies from floating point instruction to floating point instruction. Basic floating point instructions may require only a floating point operation. Other floating point instructions may be implemented by a floating point operation and a plurality of memory load operations.

MROM access 64 is a storage device capable of storing microcode instructions. In one embodiment, MROM access 64 is a read only memory (ROM). In other embodiments, other storage devices can be used to implement MROM access 64. MROM access 64 uses the entry point microaddress generated by MROM entry point 62 to access the first microcode line of a microcode sequence. In one embodiment, MROM access 64 stores multiple microcode instructions in each microcode line of MROM access 64. In one specific embodiment, each microcode line contains a number of microcode instructions equal to the number of functional units in microprocessor 10. For example, if microprocessor 10 has three functional units, MROM access 64 stores three microcode instructions per microcode line. In FIG. 11, MROM access 64 includes position 0, position 1, and position 2. Each position stores one microcode instruction. The microcode instructions from MROM access 64 are dispatched to MROM early decode 66.

MROM 34 parses a floating point instruction into one or more floating point operations and one or more integer operations. The floating point operations are dispatched to the floating point unit and the integer operations are dispatched into the instruction processing pipeline. The microcode sequence that effectuates the function of a floating point instruction may include one or more floating point operations and one or more integer operations. For example, a floating point instruction with no memory operands is parsed into a floating point instruction and no corresponding integer operations. A floating point instruction with a 64 bit real number memory operand is parsed into a floating point instruction in two integer operations. The two integer operations are memory load operations that cause load/stored unit 26 to load two 32-bit memory operands from external memory. Still other floating point operations are parsed into a plurality of floating point operations and a plurality of integer operations. For example, the floating point store environment instruction (FSTENV) stores the status of the floating point unit. The microcode sequence that effectuates the functionality of FSTENV is shown below.

| mfsr T1, CW | MVSR T2, FIP | MVSR T3, FOP |
| mfsr T4, SW | MVSR T5, FCSEL | MVSR T6, FDAT |
| mrsr T7, TW | MVSR T8, FDSEL | MV T10, OP |
| ADD T10, #27 | LD8S0 null, [OP] | LD8S0 null, [T10] |
| ST32S0 [OP], T1 | ST32S4 [OP], T2 | ST16S8 [OP], T3 |
| ADD OP, #10 | ST32S0 [OP], T4 | ST16S4 [OP], T5 |
| ST32S8 [OP], T6 | ADD OP, #10 | ST32S0 [OP], T7 |
| ST16S0 [OP], T8 | | |

Where mfsr is a move floating special register instruction, MVSR is an integer move special register instruction, LDxxSx is an integer load instruction, and STxxSx is an integer store instruction. The microcode sequence moves the needed status data to temporary registers (T1–T8). The sequence performs two load instructions. The first load instruction loads data from the beginning of the memory block to which the status is to be stored (pointer is stored in OP) and the second load instruction load data at the end of the memory block. If a memory protection violation occurs, no store instructions are executed. The microcode sequence then stores the status data from the temporary registers to memory locations.

The microcode instructions to effectuate the function of many floating point instructions are redundant except for the floating point operation. For example, the microcode instructions required to implement many arithmetic functions with a 64 bit real number memory operand are a floating point operation and two memory load operations. To eliminate the need for storing essentially redundant microcode sequences, MROM unit 34 allows a floating point opcode to be substituted for a floating point opcode within a microcode sequence. In this manner, similar floating point instructions are categorized together and use the same microcode sequence which reduces the number of unique microcode sequences can be reduced. For example, all adds, multiplies and compares with the same addressing mode can use one microcode sequence. Multiplexer 178 allows an opcode that indicates whether the floating point operation is an add, a multiply, or a compare to be substituted in place of the floating point opcode within the microcode sequence of a floating point instruction category.

The floating point instruction from instruction cache 16 is routed to FPU decoder 172. The opcode of the floating point instruction is partially decoded and stored in opcode register 174. The partially decoded opcode stored in opcode register 174 may be substituted for the floating point operation stored in position zero of MROM access 64 by multiplexer 178. In one embodiment, a bit within the microcode instruction at position zero of MROM access 64 controls whether multiplexer 178 selects the floating point opcode from position zero of MROM access 64 or opcode register 174. In one embodiment, a portion of the microcode instruction stored in position zero of MROM access 64 is always routed to FPU 36 as part of the floating point operation. The microcode sequence for the category of floating point instructions with a 64 bit real number memory operand includes one microline. Position 0 stores a floating point operation with a bit set indicating that the floating point opcode should be selected from opcode register 174. Positions 1 and 2 store memory load microcode instructions. In this manner, the same microcode sequence is used for several instructions with a 64 bit real number memory operand. A unique microcode sequence is stored for each category of floating point instructions. The floating instruction categories and the floating point instructions within those categories for one embodiment of microprocessor 10 is shown below. One microcode routine is stored in MROM access 64 for each floating point instruction category.

| Category 1. No memory operand instructions. | | | |
|---|---|---|---|
| FADD ST, ST(i) | FADD ST(i), ST | FADDP ST(i), ST | FADDP |
| FCHS | FNCLEX | | |
| FCOM | FCOM ST(i) | FABS | |
| FCOS | FDECSP | | |
| FDIV ST, ST(i) | FDIV ST(i), ST | FDIVP ST(i), ST | FDIVP |
| FDIVR ST, ST(i) | FDIVRP ST(i), ST | FDIVRP | |
| FFREE ST(i) | FINCSTP | FNINIT | FLD ST(i) |
| FLD1 | FLDL2T | FLDL2E | FLDPI |
| FLDLG2 | FLDLN2 | FLDZ | |
| FMUL ST, ST(i) | FMUL ST(i), ST | FMULP ST(i), ST | FMULP |
| FPATAN | FPREM | FPREM1 | FPTAN |

-continued

| | | | |
|---|---|---|---|
| FRNDINT | FSCALE | FSIN | FSINCOS |
| FSQRT | FST ST(i) | FSTP ST(i) | |
| FSUB ST, ST(i) | FSUB ST(i), ST | FSUBP ST(i), ST | FSUBP |
| FSUBR ST, ST(i) | FSUBR ST(i), ST | FSUBRP ST(i), ST | FSUBRP |
| FTST | | | |
| FUCOM ST(i) | FUCOM | FUCOMP ST(i) | FUCOMP |
| FUCOMPP | FWAIT | FXAM | FXCH |
| FXTRACT | FYL2X | FYL2XP1 | |

Category 2. Instructions with a 64 bit real number memory operand.

| | | | |
|---|---|---|---|
| FADD m64real | FCOM m64real | FDIV m64real | FDIVR m64real |
| FLD m64real | FMUL m64real | FSUB m64real | FSUBR m64real |

Category 3. Instructions with a 32 bit real number memory operand.

| | | | |
|---|---|---|---|
| FADD m32real | FCOM m32real | FDIV m32real | FDIVR m32real |
| FLD m32real | FMUL m64real | FSUB m32real | FSUBR m32real |

Category 4. Instructions with 16 bit integer operands in memory.

| | | | |
|---|---|---|---|
| FIADD m32int | FIDIV m32int | FIDIVR m32int | FICOM m32int |
| FICOMP m32int | FILDm32int | FIMUL m32int | |
| FISUB m32int | FISUBR m32int | | |

Category 5. Instructions with 16 bit integer operands from memory.

| | | | |
|---|---|---|---|
| FIADD m16int | FIDIV m16int | FIDIVR m16int | FICOM m16int |
| FICOMP m16int | FILD m16int | FLDCW m2byte | FIMUL m16int |
| FISUB m16int | FISUBR m16int | | |

In contrast, some instructions require unique microcode sequences to effectuate the function of the floating point instruction. For example, the FSTENV instruction discussed above has a unique microcode sequence for each mode of operation (real or protected) and format (16 or 32 bit). Thirty-two unique microcode sequences for floating point instructions of microprocessor 10 are listed below.

1. FBLD - load BCD.
2. FLD m80real - an 80 bit load.
3. FILD m64int - a 64 bit integer load.
4. FIST m32int convert to a 32 bit integer and store.
5. FIST m16int convert to a 16 bit integer and store.
6. FISTP m64int convert to a 64 bit integer, store, and pop the stack.
7. FISTP m32int convert to a 32 bit integer, store, and pop the stack.
8. FISTP m16int convert to a 16 bit integer, store, and pop the stack.
9. FLDENV 32 bit protected
10. FLDENV 16 bit protected
11. FLDENV 32 bit real mode
12. FLDENV 16 bit real mode
13. FRSTOR 32 bit protected
14. FRSTOR 16 bit protected
15. FRSTOR 32 bit real mode
16. FRSTOR 16 bit real mode
17. FNSAVE 32 bit protected
18. FNSAVE 16 bit protected
19. FNSAVE 32 bit real mode
20. FNSAVE 16 bit real mode
21. FST m64real
22. FST m32real
23. FSTP m80real
24. FSTP m64real
25. FSTP m32real
26. FNSTCW
27. FNSTENV 32 bit protected
28. FNSTENV 16 bit protected
29. FNSTENV 32 bit real mode
30. FNSTENV 16 bit real mode
31. FNSTSW m2byte
32. FNSTSW AX As discussed above, floating point operations from either MROM access 64 or opcode register 174 are routed to FPU 36. Integer operations from MROM access 64 are routed to MROM early decode 66. MROM early decode 66 formats the instructions similar to the formatting of early decode 40 as discussed above in reference to FIG. 2. The decoded integer operations are conveyed to reorder buffer 32 and/or load/store unit 26. NROM early decode 66 also conveys instruction information to reorder buffer 32. The instruction information indicates that the instruction is a floating point instruction and contains the floating point opcode.

When reorder buffer 32 receives the instruction information associated with a floating point instruction, reorder buffer 32 allocates a line of storage for the floating point instruction. Reorder buffer 32 additionally supplies a line tag on tag bus 152 to load/store unit 26 and floating point unit 36. The line tag identifies the line of storage to which the floating point instruction was allocated within reorder buffer 32. The line tag is conveyed to load/store unit 26 to be output with the memory operand loaded from memory. The line tag is conveyed to FPU 36 to allow FPU 36 to identify memory operands associated with a floating point instruction when they become available on result bus 38. As discussed above, reorder buffer 32 includes storage sufficient to store three microcode instructions per line of storage. Additionally, each line of storage in reorder buffer 32 includes a shared field. In one embodiment, the floating point operation is not stored in an instruction storage position within reorder buffer 32. Each integer operation associated with a floating point operation, however, is stored within a line of storage of reorder buffer 32. The floating point bit within the shared field of the line of storage allocated to the floating point instruction indicates that the integer operations stored within the line of storage are associated with a floating point instruction. In one embodiment, the share field additionally stores the opcode of the associated floating point operation. The floating point opcode is used to update a status register when the instruction is retired. The status register identifies the last floating point instruction properly executed. A line of storage is allocated to the floating point instruction even if no integer operations are dispatched in conjunction with the floating point operation. In this case, the line of storage serves as a place holder for the floating point instruction. When all of the instructions earlier in the program execution sequence have been retired, the reorder buffer attempts to retire the floating point instruction.

Integer operations that load memory operands are routed to load/store unit 26. Load/store unit 26 receives the memory operand operations from MROM early decode 66 via multiplexer 42. Load/store unit 26 receives each memory load operation and a signal indicative of the position (position 0, position 1 or position 2) of MROM access 64 from which the memory load operation was received. Load/store unit 26 also receives a line tag from reorder buffer 32 via tag bus 152. As discussed above, the line tag identifies the line of storage within reorder buffer 32 to which the floating point operation was allocated. Load/store unit 26 loads the memory operands from external memory. Load/store unit 26 conveys the memory operands to floating point unit 36 via result bus 38. Result bus 38 includes a tag that identifies to which floating point operation within floating point unit 36 the memory operand corresponds and identifies the portion of the floating point operand to which the memory operand corresponds. The floating point instruction is identified by the line tag received from reorder buffer 32. The portion of the floating point operand is identified by the position of MROM access 64 from which load/store unit 26 received the load operation.

Figure 12:
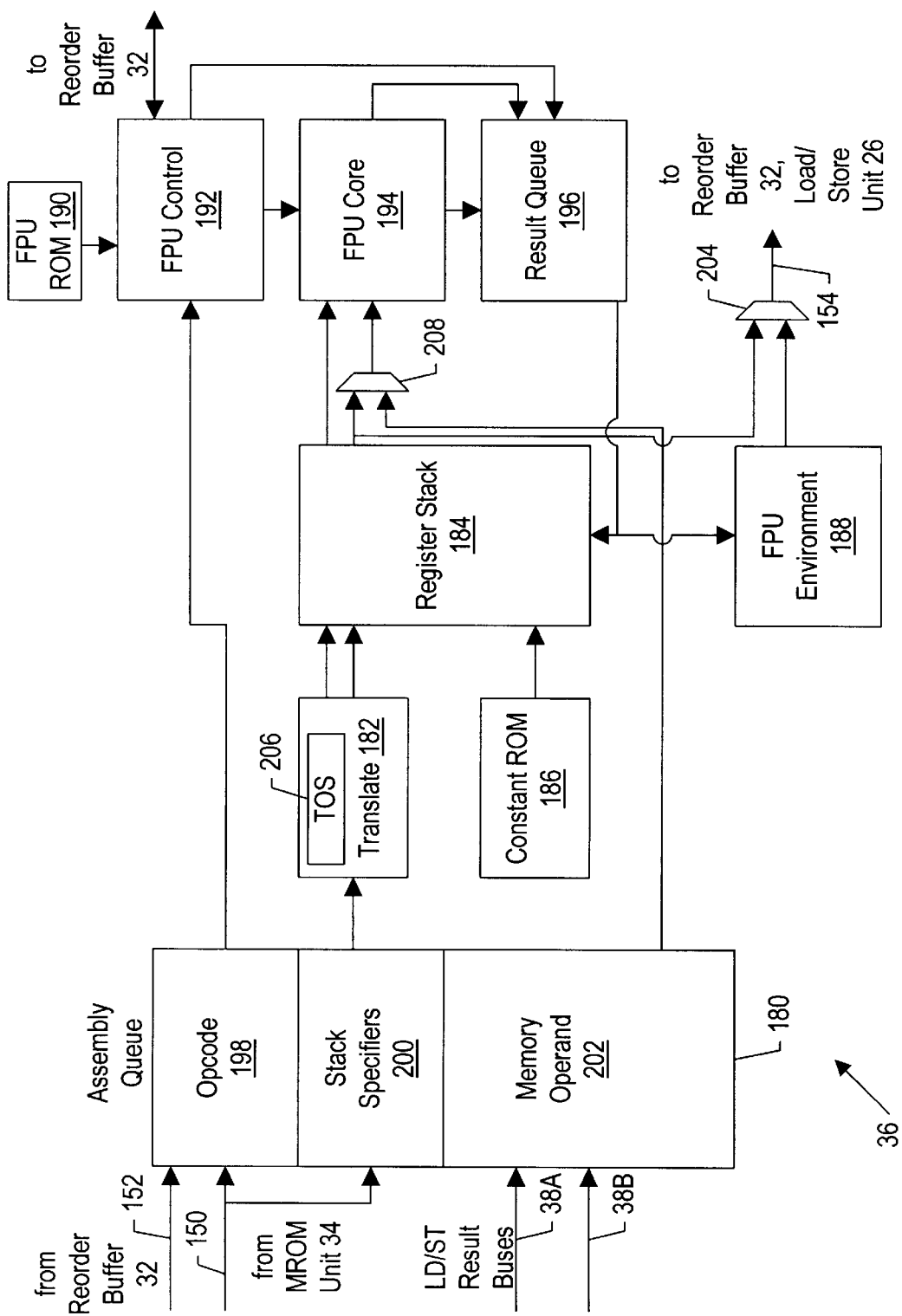
FIG. 12 is a block diagram of one embodiment of the floating point unit shown in FIG. 10.

Turning next to FIG. 12, a block diagram of one embodiment of FPU 36 is shown. As shown in FIG. 12, FPU 36 includes an assembly queue 180, and translate unit 182, a register stack 184, a constant read-only memory (ROM) 186, an FPU environment unit 188, an FPU ROM 190, an FPU control unit 192, an FPU core 194, and a result queue 196. Assembly queue 180 comprises multiple queue entries, each of which is configured to store instruction information corresponding to one floating point operation. As shown in FIG. 12, assembly queue 180 includes several fields for each entry. An opcode field 198 is included for storing the opcode of the floating point operation and the corresponding reorder buffer tag, or line tag, and a stack specifiers field 300 is included for storing register specifiers which select storage locations within register stack 184. The selected registers provide operands for the corresponding instructions. The values stored in opcode field 198 and stack specifier field 200 are received by FPU 36 upon float operation bus 150 from MROM unit 34 and tag bus 152 from reorder buffer 32. Assembly queue 180 further includes a memory operand field 202 for storing a floating point operand used by the instruction. The floating point operand is received upon load/store result buses 38A and 38B. As discussed above, the floating point operand may comprise a plurality of memory operands. Each memory operand is stored in memory operand queue 202 until all memory operands that comprise a floating point operand are received.

Assembly queue 180 is coupled to FPU control unit 192 and to translate unit 182. Translate unit 182 is coupled to register stack 184, which is further coupled to constant ROM 186, result queue 196, and FPU core 194. FPU environment 188 is coupled to result queue 196 and is coupled to provide, through multiplexer 304, a result upon FPU result bus 154. Register stack 184 may also provide a result upon FPU result bus 154 through multiplexer 304. FPU control unit 192 is coupled to FPU ROM 190, result queue 196, and FPU core 194. FPU core 194 is further coupled to result queue 196. FPU control unit 192 is further coupled to receive the signals forming FPU interface 76 (e.g. the signals upon conductors 152, 156, 158, 160, 162, 164, 166, 168, and 170).

Generally speaking, instructions and their corresponding memory operands are received into assembly queue 180. Instructions are dispatched from assembly queue 180 into the execution pipeline of FPU 36. Upon exit from the execution pipeline, the results of the instruction are stored into result queue 196. The results are held in result queue 196 until a retire indication is received from reorder buffer 32. Upon receipt of the retire indication, the results are stored into register stack 184 (or FPU environment 188, if the destination of the instruction is an FPU environment register such as the control word or the status word).

When an instruction is dispatched into the execution pipeline, the stack specifiers for the instruction are conveyed to translate unit 182. In one embodiment, FPU 36 uses a stack-based register file in which one of the registers is defined to be the top of the stack. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is somewhat dependent upon the instructions which execute prior to that instruction (since these instructions may affect which register is the top of the stack). Translate unit 182 maps the stack specifiers to the registers within register stack 184 based upon a speculative top of stack value which reflects execution of the instructions prior to a particular instruction in program order (including the instructions still within the execution pipeline of FPU 36). A top of stack (TOS) register 206 is included for storing the top of stack indicator. Additionally, a table is provided within translate unit 182 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers.

Translate unit 182 provides the translated register specifiers to register stack 184, which reads the values from the corresponding register locations and provides the values to FPU core 194. The memory operand for the instruction may be substituted for one of the operands from register stack 184 via multiplexer 208. Register stack 184 includes the architected FPU registers defined by the microprocessor architecture employed by microprocessor 10. For example, embodiments of microprocessor 10 employing the x86 microprocessor architecture include eight architected registers within register stack 184. Additionally, register stack 184 may include temporary registers for use by floating point microcode routines stored in FPU ROM 190, as described below. In one embodiment, 24 temporary registers are included.

FPU core 194 includes the hardware used to manipulate the source operands of the floating point operation in order to produce the result of the operation. For example FPU core 194 includes a multiplier for multiplying the input operands, an adder for adding the input operands, etc. FPU core 194 routes the operands to the various pieces of hardware in response to control signals from FPU control unit 192. FPU control unit 192 receives the opcode for a given instruction from assembly queue 180 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 192 handles the interface to reorder buffer 32 and communicates with other elements of FPU 36 according to communications upon the interface. For example, when a particular instruction receives a retire indication, FPU control unit 192 communicates with result queue 196 to cause the corresponding instruction result to be stored into register stack 184. If the instruction has not yet been completed, result queue 196 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 190. The microcoded routines within FPU 36 are referred to as nanocode routines. Effectively, the transcendental instructions make multiple passes through the execution pipeline in order to complete. Intermediate results are calculated by the instructions within the nanocode routine, and the final result is formed by calculating upon the intermediate results.

Assembly queue 180 provides the floating point opcode to FPU control 192. FPU control 192 decodes the floating point opcode to determine whether the floating point operation is a basic arithmetic operation or a transcendental operation. If the floating point operation is a basic arithmetic operation, FPU control 192 dispatches the floating point operation to FPU core 194. If the floating point operation is a transcendental operation, FPU control 192 generates an entry point within FPU ROM 190. The entry point identifies the starting address of a nanocode sequence that implements the function of the transcendental operation. FPU control 192 reads the nanocode sequence from FPU ROM 190 and dispatches the nanocode floating point instructions to FPU core 194 one at a time. FPU control 192 does not receive any floating point operations from assembly queue 180 while nanocode floating point operations are dispatched from FPU ROM 190. When FPU control 192 has dispatched all of the nanocode instructions within the nanocode sequence that implements the transcendental operation, FPU control 192 receives the next floating point opcode from assembly queue 180 and decodes the opcode to determine whether the floating point operation is a basic arithmetic operation or a transcendental operation.

The nanocode routines may make use of a set of constants stored in constant ROM 186. The constants stored in constant ROM 186 are useful in calculating results for the transcendental instructions. For example, the floating point representations of 1, 0, −1, Pi, etc., as well as constants particular to the microcoded routines may be stored in constant ROM 186. The constants may be loaded into temporary registers for use by the nanocoded routines. According to one embodiment, constant ROM 186 stores 128 double precision constants and 64 single precision constants.

FPU environment 188 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 180 in program order, and are provided into the execution pipeline of FPU 36 in program order as well. An instruction may be ready for execution within assembly queue 180 (i.e. all operands provided) but may remain stored therein because another instruction prior the instruction in program order is not ready for execution. In other words, assembly queue 180 operates as a first-in, first-out (FIFO) buffer. Similarly, results are stored from result queue 196 into register stack 184 and/or FPU environment 188 in program order.

Figure 13:
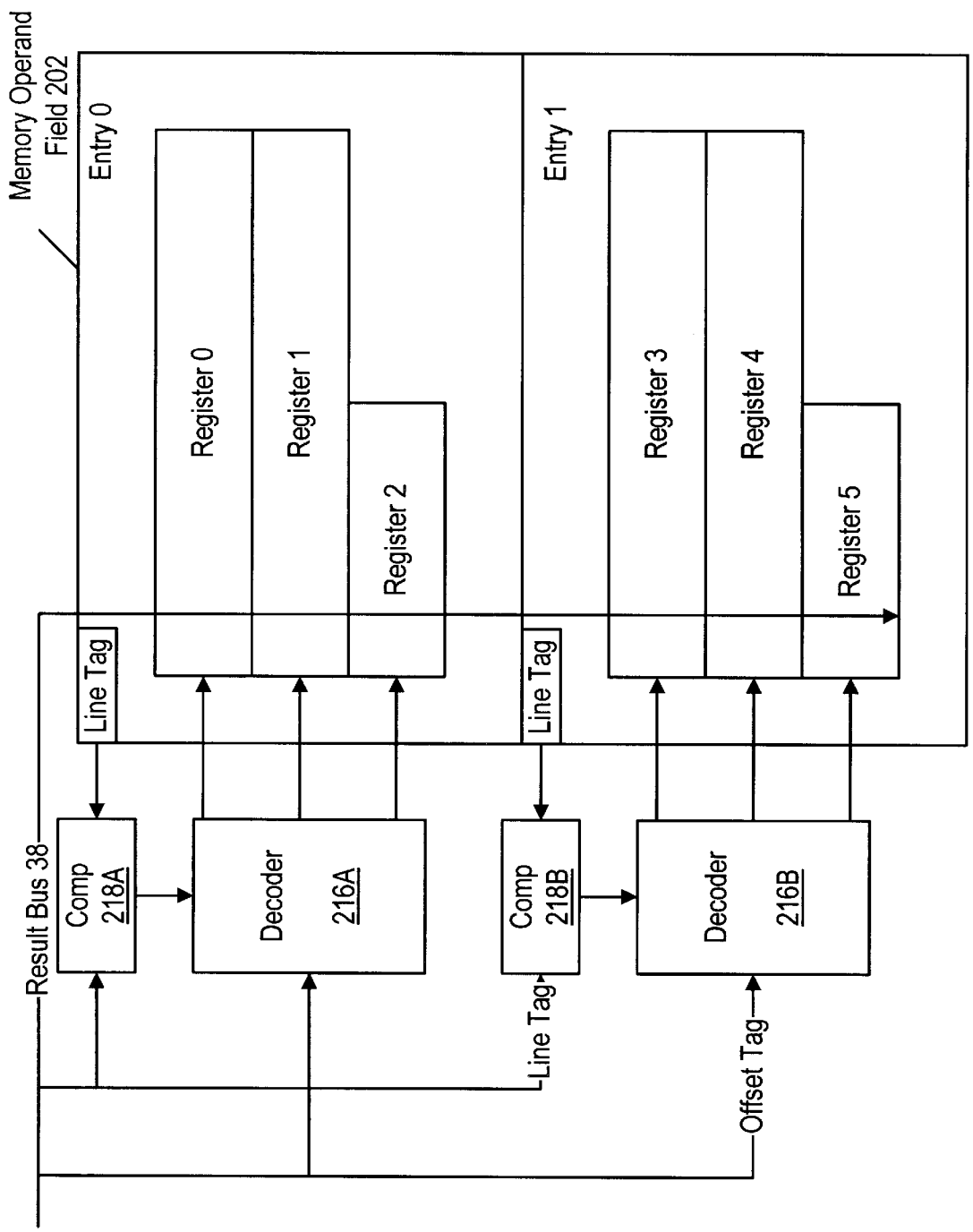
FIG. 13 is a block diagram illustrating the memory operand field of a plurality of entries of an assembly queue.

Turning now to FIG. 13, a block diagram of two entries of memory operand field 202 of an assembly queue 180 is shown. In the illustrated embodiment, memory operand field 202 includes entry 0 and entry 1. In other embodiments, memory operand field 202 may include additional entries. Each entry includes a plurality of registers. In the illustrated embodiment, each entry includes three registers: two 32-bit registers and one 16-bit register. In the illustrated embodiment, each entry is configured to store an 80-bit floating point operand. A portion of the operand is stored in each register within an entry. Result bus 38 is coupled to each register within memory operand field 102. Result bus 38 is additionally coupled to comparators 218 and decoders 216. A data portion of result bus 38 is coupled to each register. A line tag portion of result bus 38 is coupled to comparators 218, and offset tag portion of result bus 38 is coupled to decoders 216. Line tags associated with each entry of memory operand field 202 are also coupled to comparators 218.

When a memory operand is available on result bus 38, the memory operand data is available to each register within memory operand field 202. A line tag identifies to which entry within memory operand field 202, the memory operand corresponds. The line tag associated with the memory operand is compared to a line tag associated with each entry of memory operand field 202 by comparators 218. An offset tag identifies to which register within an entry, the memory operand corresponds. Using the line tag and offset tag, decoders 216 and comparators 218 enable one register. The enabled register stores the memory operand. Each portion of the floating point operand is stored in a similar manner.

Each entry of memory operand field 202 stores a floating point operand for a floating point operation corresponding to that entry. If a floating point operation has an 80-bit operand, the 80-bit operand is stored in three portions. For example, if the floating point operand for the floating point operation corresponding to entry 0 is an 80-bit operand, a 32-bit portion of the floating operand is stored in register 0, a second 32-bit portion of the floating point operand is stored in register 1 and a 16-bit portion of the floating point operand is stored in register 2. After all three portions of the 80-bit operand have been stored in entry 0, the floating point operation is ready to be dispatched into the floating point instruction pipeline.

Figure 14:
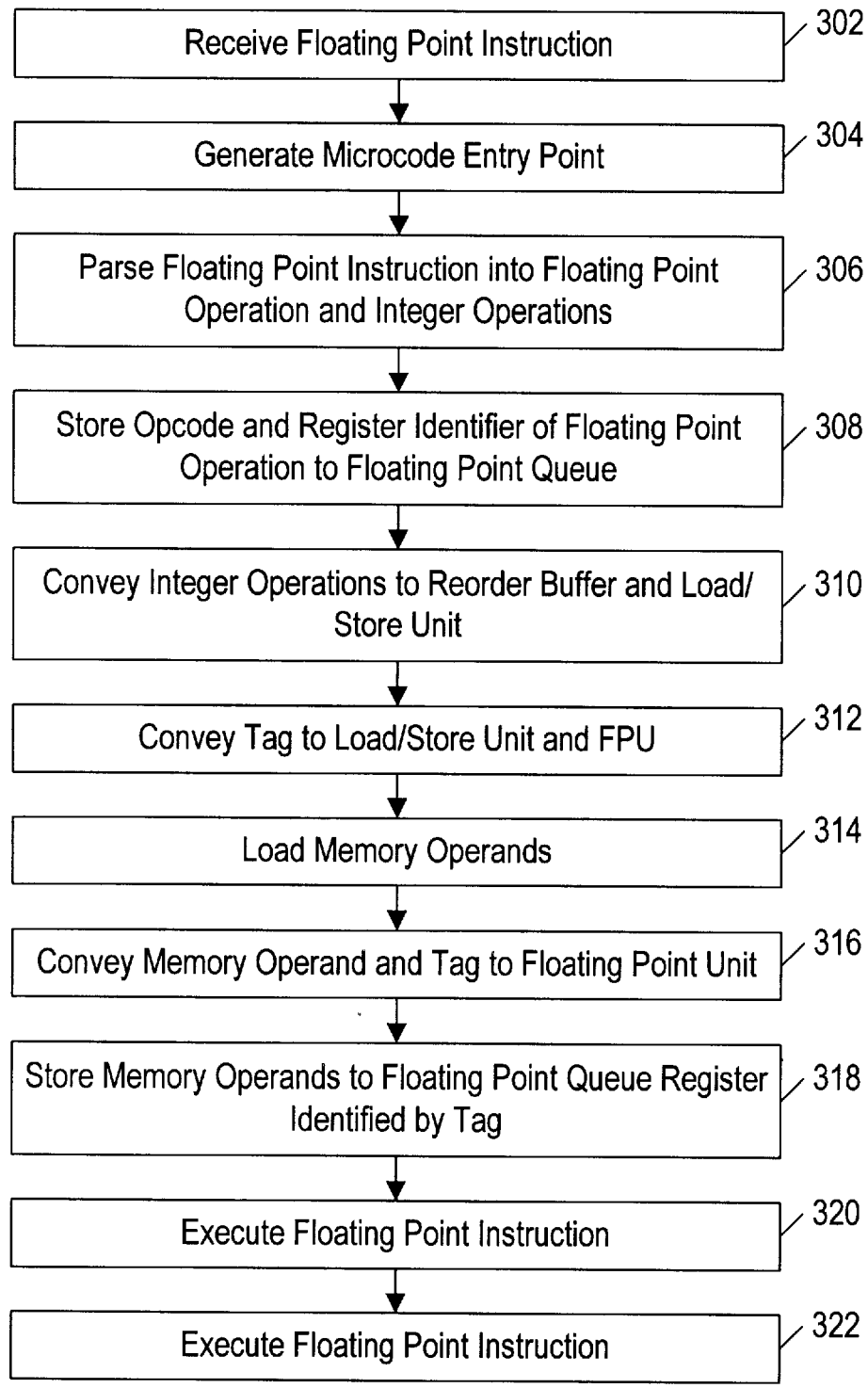
FIG. 14 is a flowchart illustrating the execution of a floating point instruction, according to one embodiment of the microprocessor.

Turning now to FIG. 14, a flowchart illustrating the execution of a floating point instruction according to one embodiment of microprocessor 10 is shown. In step 302, a floating point instruction is received from an instruction cache. In a preferred embodiment, floating point instructions are classified as microcode instructions and dispatched to a microcode unit. In step 304, an entry point, or beginning address, for a microcode sequence that effectuates the function of the floating point instruction is generated. The microcode sequence parses the floating point instruction into one or more floating point operations and one or more integer operations. For example, the floating point instruction may be parsed into a floating point operation and a plurality of memory load operations. In step 308, the opcode and register identifiers of the floating point operation are stored in a queue of the floating point unit. The floating point unit queue contains a plurality of entries for storing the opcode, register identifiers, and memory operands of floating point operations. In step 310, the memory load operations are conveyed to the reorder buffer and load/store unit.

The reorder buffer allocates a line of storage for the floating point instruction and dispatches a line tag identifying the line of storage allocated to the floating point instruction. Each floating point instruction within the reorder buffer is issued a unique line tag. Each integer operation of a floating point instruction stored in one line of the reorder buffer is issued to same line tag. If multiple memory load operations of a floating point instruction are conveyed to the load/store unit, the load/store unit detects the order of the memory load operations. In step 312, the line tag dispatched by the reorder buffer is conveyed to the load/store unit. In step 314, the load/store unit loads a memory operand from external memory. In step 316, the load/store unit conveys the memory operand and a tag to the floating point unit. The tag identifies the floating point instruction associated with the memory operand by providing the line tag received from the reorder buffer. By comparing the line tag of the memory operand to the line tag associated with each floating point operation, the floating point queue can identify the floating point instruction to which a memory operand is associated. The offset tag of the memory operand identifies the portion of the floating point operand to which the memory operand corresponds. As discussed above, each floating point operand may include a plurality of memory operands. The load/store unit monitors the order of the memory operands and generates the offset tag based on this information. In step 318, the memory operands are stored in the appropriate registers of the floating point queue. The appropriate registers are identified by the line tag and offset tag associated with the memory operand. When all of the memory operands are received by the floating point queue, the floating point operation is ready for execution. In one embodiment, floating point instructions are executed in program order. When all floating point instructions earlier in program order have been dispatched for execution, then in step 320 the floating point instruction is executed. In step 322, the result of the floating point instruction is stored. In one embodiment, result of a floating point operation are stored in a register file, such as register stack 184.

Figure 15:
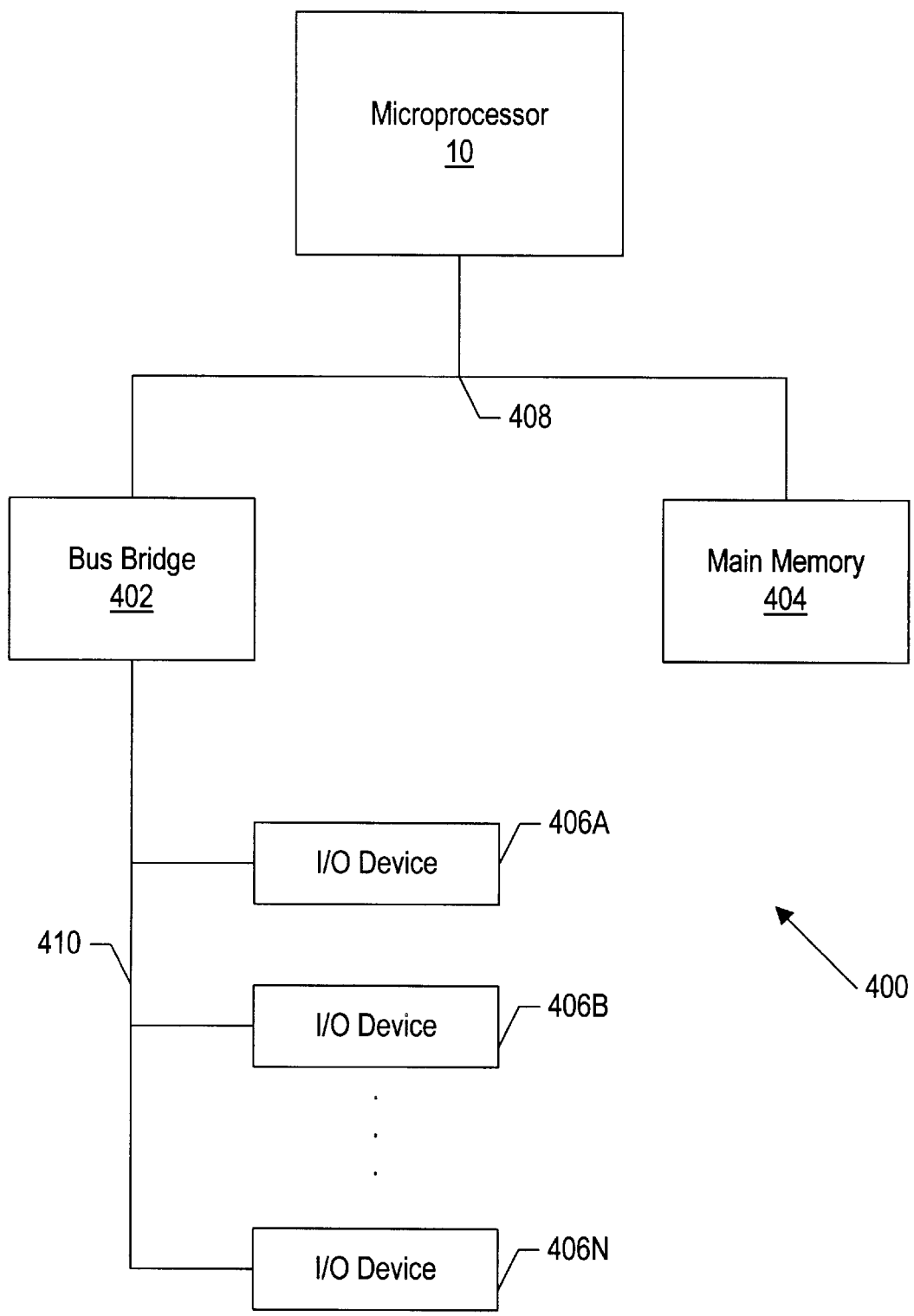
FIG. 15 is a block diagram of a computer system employing the microprocessor shown in FIG. 1.

Turning now to FIG. 15, a computer system 400 including microprocessor 10 is shown. Computer system 400 further includes a bus bridge 402, a main memory 404, and a plurality of input/output (I/O) devices 406A–406N. Plurality of I/O devices 406A–406N will be collectively referred to as I/0 devices 406. Microprocessor 10, bus bridge 402, and main memory 404 are coupled to a system bus 408. I/0 devices 406 are coupled to an I/0 bus 410 for communication with bus bridge 402.

Bus bridge 402 is provided to assist in communications between I/O devices 406 and devices coupled to system bus 408. I/O devices 406 typically require longer bus clock cycles than microprocessor 10 and other devices coupled to system bus 408. Therefore, bus bridge 402 provides a buffer between system bus 408 and input/output bus 410. Additionally, bus bridge 402 translates transactions from one bus protocol to another. In one embodiment, input/output bus 410 is an Enhanced Industry Standard Architecture (EISA) bus and bus bridge 402 translates from the system bus protocol to the EISA bus protocol. In another embodiment, input/output bus 410 is a Peripheral Component Interconnect (PCI) bus and bus bridge 402 translates from the system bus protocol to the PCI bus protocol. It is noted that many variations of system bus protocols exist. Microprocessor 10 may employ any suitable system bus protocol. I/O devices 406 provide an interface between computer system 400 and other devices external to the computer system. Exemplary I/O devices include a modem, a serial or parallel port, a sound card, etc. I/O devices 406 may also be referred to as peripheral devices. Main memory 404 stores data and instructions for use by microprocessor 10. In one embodiment, main memory 404 includes at least one Dynamic Random Access Memory (DRAM) and a DRAM memory controller.

It is noted that although computer system 400 as shown in FIG. 15 includes one bus bridge 402, other embodiments of computer system 400 may include multiple bus bridges 402 for translating to multiple dissimilar or similar I/O bus protocols. Still further, a cache memory for enhancing the performance of computer system 400 by storing instructions and data referenced by microprocessor 10 in a faster memory storage may be included. The cache memory may be inserted between microprocessor 10 and system bus 408, or may reside on system bus 408 in a "lookaside" configuration. It is still further noted that the functions of bus bridge 402, main memory 404, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAD | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |

TABLE 1-continued x86 Fast Path, Double Dispatch, and MROM Instructions

| X86 Instruction | Instruction Category |
|---|---|
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

What is claimed is:

1. A circuit for executing floating point instructions comprising:

a microcode unit that is configured to store a plurality of microcode sequences to effectuate the function of said floating point instructions, wherein one of said microcode sequences includes a floating point operation and one or more integer operations, wherein said integer operations load a floating point operand for said floating point operations;

a floating point unit coupled to said microcode unit, wherein said microcode unit is configured to convey said floating point operation to said floating point unit, and said floating point unit is configured to execute said floating point operation when said integer operations have loaded said floating point operand;

wherein said floating point operand is larger than an integer operand, and multiple integer operations are required to load said floating point operand .

2. The circuit for executing floating point instructions of claim 1 wherein said floating point unit includes:

a floating point core configured to execute floating point operations;

a floating point memory configured to store nanocode sequences; and a floating point control unit coupled to said floating point memory, wherein said floating point control unit is configured to decode said floating point operation and either to dispatch said floating point operation to said floating point core or to generate an entry point for a nanocode sequence in said floating point memory.

3. The circuit for executing floating point instructions of claim 2 wherein said nanocode sequence contains a plurality of floating point operations configured to be dispatched to said floating point core.

4. The circuit for executing floating point instructions of claim 1 further comprising an opcode register coupled to said floating point unit, wherein a plurality of floating point instructions are configured to invoke a same one said microcode sequences and an opcode is conveyed from said opcode register.

5. The circuit for executing floating point instructions of claim 4 wherein said plurality of floating point instructions that utilize said same microcode sequence generate a same entry point.

6. The circuit for executing floating point instructions of claim 4 wherein an opcode stored in said opcode register is a partially decoded version of a floating point instruction that invoked said microcode sequence.

7. The circuit for executing floating point instructions of claim 4 further comprising a multiplexer coupled to said opcode register, said floating point unit, and said microcode unit, wherein said multiplexer is configured to select either said opcode stored in said opcode register or an opcode stored in said microcode unit.

8. A method for executing floating point instructions comprising;

receiving a floating point instruction;

generating a microcode entry point for said floating point instruction, wherein said microcode entry point identifies a microcode sequence that includes a floating point operation and one or more integer operations, wherein a floating point operand is larger than an integer operand, and multiple integer operations are required to load said floating point operand;

conveying said floating point operation to a floating point instruction unit, dispatching said one or more integer operations into an instruction processing pipeline;

executing said floating point operation; and storing a result of said floating point operation.

9. The method for executing floating point instructions of claim 8 further comprising loading memory operands, wherein said one or more integer operations cause said memory operands to be loaded, and said step of executing said floating point operation occurs after said memory operands are loaded.

10. The method for executing floating point instructions of claim 9 wherein said floating point operand includes a plurality of said memory operands, and multiple integer operations are required to load said floating point operand.

11. The method for executing floating point instructions of claim 8 wherein said result is stored to either a memory or a register file.

12. The method for executing floating point instructions of claim 8 wherein said result is stored to a result queue.

13. The method for executing floating point instructions of claim 8 further comprising:

decoding said floating point operations; and dispatching said floating point operations to a floating point core or generating a nanocode entry point for said floating point operations, wherein said nanocode entry point identifies a nanocode sequence.

14. The method for executing floating point instructions of claim 13 wherein said nanocode sequence includes a plurality of floating point operation that effectuates the function of said decoded floating point operation.

a floating point unit coupled to said microcode unit, wherein said microcode unit is configured to convey said floating point operation to said floating point unit, and said floating point unit is configured to execute said floating point operation when said integer operations have loaded said floating point operand.

15. A microprocessor comprising:

an instruction cache;

an instruction alignment unit coupled to said instruction cache;

a decode unit coupled to said instruction alignment unit;

a functional unit coupled to said decode unit;

a microcode unit that is configured to store a plurality of microcode sequences to effectuate the function of said floating point instructions, wherein one of said microcode sequences includes a floating point operation and one or more integer operations, wherein said integer operations load a floating point operand for said floating point operations;

a floating point unit coupled to said microcode unit, wherein said microcode unit is configured to convey said floating point operation to said floating point unit, and said floating point unit is configured to execute said floating point operation when said integer operations have loaded said floating point operand;

wherein said floating operand is larger then an integer operand, and multiple integer operations are required to load said floating point operand.

16. The circuit for executing floating point instructions of claim 15 wherein said floating point unit includes:

a floating point core configured to execute floating point operations;

a floating point memory configured to store nanocode sequences; and a floating point control unit coupled to said floating point memory, wherein said floating point control unit is configured to decode said floating point operation and either to dispatch said floating point operation to said floating point core or to generate an entry point for a nanocode sequence in said floating point memory.

17. The circuit for executing floating point instructions of claim 16 wherein said nanocode sequence contains a plurality of floating point operations configured to be dispatched to said floating point core.

18. The circuit for executing floating point instructions of claim 15 further comprising an opcode register coupled to said floating point unit, wherein a plurality of floating point instructions are configured to invoke a same one said microcode sequences and an opcode is conveyed from said opcode register.

19. The circuit for executing floating point instructions of claim 18 wherein said plurality of floating point instructions that utilize said same microcode sequence generate a same entry point.

20. The circuit for executing floating point instructions of claim 18 wherein an opcode stored in said opcode register is a partially decoded version of a floating point instruction that invoked said microcode sequence.

21. The circuit for executing floating point instructions of claim 18 further comprising a multiplexer coupled to said opcode register, said floating point unit, and said microcode unit, wherein said multiplexer is configured to select either said opcode stored in said opcode register or an opcode stored in said microcode unit.

* * * * *